US010885197B2

(12) United States Patent
Block et al.

(10) Patent No.: US 10,885,197 B2
(45) Date of Patent: Jan. 5, 2021

(54) MERGING MULTIPLE COMPUTE NODES WITH TRUSTED PLATFORM MODULES UTILIZING AUTHENTICATION PROTOCOL WITH ACTIVE TRUSTED PLATFORM MODULE PROVISIONING

(71) Applicant: International Business Machines Corporation, Armonk, NY (US)

(72) Inventors: Timothy R. Block, Rochester, MN (US); Elaine R. Palmer, Hanover, NH (US); Kenneth A. Goldman, Norwalk, CT (US); Christopher J. Engel, Rochester, MN (US); William E. Hall, Clinton, CT (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 16/138,871

(22) Filed: Sep. 21, 2018

(65) Prior Publication Data

US 2020/0097661 A1 Mar. 26, 2020

(51) Int. Cl.
*G06F 15/177* (2006.01)
*G06F 21/57* (2013.01)
(Continued)

(52) U.S. Cl.
CPC .......... *G06F 21/575* (2013.01); *H04L 9/3234* (2013.01); *H04L 9/3271* (2013.01); *H04L 63/126* (2013.01); *G06F 9/4401* (2013.01)

(58) Field of Classification Search
CPC ... G06F 21/575; H04L 9/3234; H04L 9/3271; H04L 63/126
(Continued)

(56) References Cited

U.S. PATENT DOCUMENTS 8,589,672 B2  11/2013  Dasari et al.
8,694,762 B2   4/2014  Ekberg
(Continued)

OTHER PUBLICATIONS

Fongen et al., "Attested Genuineness in Service Oriented Environments", The Third International Conference on Digital Information Processing and Communications, 2013, pp. 8-17.
(Continued)

*Primary Examiner* — Volvick Derose
(74) *Attorney, Agent, or Firm* — Matthew J. Bussan

(57) ABSTRACT

Method, apparatus, and computer program product are provided for merging multiple compute nodes with trusted platform modules (TPMs) utilizing an authentication protocol with active TPM provisioning. In some embodiments, compute nodes are connected to be available for merger into a single multi-node system. Each compute node includes a TPM accessible to firmware on the node. One compute node is assigned the role of master compute node (MCN), with the other node(s) each assigned the role of slave compute node (SCN). Active TPM provisioning in each SCN produces key information that is sent to the MCN to enable use of a challenge/response exchange with each SCN. A quote request is sent from the MCN to each SCN. In response to receiving the quote request, a quote response is sent from each respective SCN to the MCN, wherein the quote response includes slave TPM content along with TPM logs and associated signatures.

25 Claims, 12 Drawing Sheets

(51) Int. Cl.
*H04L 29/06* (2006.01)
*H04L 9/32* (2006.01)
*G06F 9/4401* (2018.01)

(58) Field of Classification Search
USPC .......................................................... 713/2
See application file for complete search history.

(56) References Cited

U.S. PATENT DOCUMENTS

| | | | |
|---|---|---|---|
| 9,223,982 | B2 | 12/2015 | Adams et al. |
| 9,413,765 | B2 | 8/2016 | Swanson et al. |
| 9,448,615 | B2 | 9/2016 | Larson et al. |
| 9,448,950 | B2 | 9/2016 | Scarlata et al. |
| 9,465,943 | B2 | 10/2016 | Paris et al. |
| 9,582,351 | B2 | 2/2017 | Boecker et al. |
| 9,608,825 | B2 | 3/2017 | Sarangdhar et al. |
| 9,633,196 | B2 | 4/2017 | Lin et al. |
| 9,720,704 | B2 | 8/2017 | Reick et al. |
| 9,766,900 | B2 | 9/2017 | Gundam et al. |
| 9,767,289 | B2 | 9/2017 | Martinez |
| 9,857,998 | B2 | 1/2018 | Lobo et al. |
| 9,916,476 | B2 | 3/2018 | Dasari et al. |
| 2005/0071625 | A1 | 3/2005 | Schwartz et al. |
| 2007/0101138 | A1* | 5/2007 | Camenisch ........... H04L 9/3234 713/168 |
| 2008/0162873 | A1* | 7/2008 | Zimmer ............ G06F 15/17337 712/22 |
| 2010/0082984 | A1 | 4/2010 | Ellison et al. |
| 2010/0125731 | A1* | 5/2010 | Dasari ................... G06F 9/5061 713/155 |
| 2011/0302425 | A1* | 12/2011 | Saripalli ................. G06F 21/57 713/189 |
| 2012/0030730 | A1 | 2/2012 | Smith et al. |
| 2015/0235263 | A1* | 8/2015 | Bodz ....................... H04L 67/10 705/14.53 |
| 2015/0281237 | A1 | 10/2015 | Swanson et al. |
| 2015/0294119 | A1* | 10/2015 | Gundam ............... G06F 21/629 713/2 |
| 2016/0127193 | A1* | 5/2016 | Deniaud ............. H04L 61/2015 709/208 |
| 2016/0142212 | A1* | 5/2016 | Sarangdhar ............. G06F 21/57 713/156 |
| 2016/0147675 | A1* | 5/2016 | Lin ......................... G06F 21/44 711/164 |
| 2016/0306975 | A1 | 10/2016 | Schmidt et al. |
| 2017/0019251 | A1* | 1/2017 | Jain ....................... H04L 9/0816 |
| 2017/0041147 | A1 | 2/2017 | Krahn et al. |
| 2017/0054707 | A1* | 2/2017 | Leicher .................. H04L 63/12 |
| 2017/0187799 | A1 | 6/2017 | Pogorelik et al. |
| 2017/0302459 | A1 | 10/2017 | Fenner et al. |
| 2017/0318056 | A1* | 11/2017 | Georges ................. H04L 41/08 |
| 2018/0246732 | A1 | 8/2018 | Puri et al. |
| 2019/0138294 | A1 | 5/2019 | Smith et al. |
| 2019/0332391 | A1* | 10/2019 | Ndu ....................... G06F 9/4406 |

OTHER PUBLICATIONS

Heller et al., "OpenPOWER secure and trusted boot, Part 1: Using trusted boot on IBM OpenPOWER servers", 13 pages, downloaded from <https://www.ibm.com/developerworks/library/l-trusted-boot-openPOWER-trs-pdf.pdf> on Aug. 28, 2018.

Nguyen et al., "Survey on secure communication protocols for the Internet of Things", Ad Hoc Networks, vol. 32, 2015, pp. 17-31.

U.S. Appl. No. 16/138,804, to Timothy R. Block et al., entitled "Merging Multiple Compute Nodes With Trusted Platform Nodules Utilizing Provisioned Node Certificates", filed Sep. 21, 2018, assigned to International Business Machines Corporation.

List of IBM Patents or Patent Applications Treated as Related (Dated Sep. 22, 2018).

* cited by examiner

MERGING MULTIPLE COMPUTE NODES WITH TRUSTED PLATFORM MODULES UTILIZING AUTHENTICATION PROTOCOL WITH ACTIVE TRUSTED PLATFORM MODULE PROVISIONING

BACKGROUND

1. Field of the Invention

The present invention relates in general to the field of data processing systems. More particularly, the present invention relates to enhancing security in multi-node systems while merging compute nodes with trusted platform modules by utilizing an authentication protocol with active trusted platform module provisioning.

2. Background of the Related Art

Compute nodes may be scaled together and work together as a single multi-node system (also known as a "scale up server" or a "multi-node SMP server"). Each node within the multi-node system typically has a trusted platform module (TPM) and stores security settings in the TPM. For example, the TPM is typically installed on a server's motherboard in some fashion along with processors and memory to comprise a single compute node. For enterprise class servers, multiple TPMs (e.g., a primary TPM and an alternate TPM that is synchronized with the primary TPM) may be installed as part of a single node architecture to provide Reliability and Serviceability (RAS) support to prevent single points of failure.

A "trusted platform module" (TPM) is a processor chip that implements a specification published by the Trusted Computing Group (TCG) detailing a secure crypto-processor that can store cryptographic keys that protect information. A trusted platform module offers a number of capabilities, including "remote attestation" whereby the local host server authenticates its hardware and software configuration to a trusted remote server, making use of nearly unforgeable hashes of hardware and software configuration kept within the TPM. If it is detected that a hash has changed, then this indicates that the hardware or software configuration has been modified and trust may be lost.

Many server architectures make use of a TPM to establish a root of trust chain for firmware which is anchored in hardware. The TPM implements a small cryptographic engine which provides basic building blocks for the creation of a firmware root of trust, the architecture of which comes from the Trusted Computing Group's (TCG) TPM specification.

The merging of multiple nodes for an enterprise server, for example, may be done to provide a single server view (image) with enhanced processor and memory capabilities to meet high end demands. The merging of nodes is typically accomplished under the control of a service processor, such as a flexible service processor (FSP). The service processor is typically treated as being in a separate security domain from the security domain of the host system with its processors, memory, and TPM(s).

The advent of a service processor controlled node merge operation where the service processor is either untrusted, or at least not trusted to the same level as the host security domain, leaves the merge process vulnerable to certain security threats.

Threats that may need to be considered for the multi-node server environment include spoofing (node impersonation if lacking authentication of nodes), tampering (integrity of node protocol messages thereby exposing threat of relay and replay attacks by a malicious service processor or exploited hypervisor), information disclosure, denial of service, multiple master attacks, and code and TPM event log integrity issues.

SUMMARY

Embodiments disclose a method, an apparatus, and a computer program product for merging multiple compute nodes with trusted platform modules utilizing an authentication protocol with active trusted platform module (TPM) provisioning. In accordance with one or more embodiments, multiple compute nodes are connected so as to be available for merger into a single multi-node system. Each compute node includes a TPM accessible to firmware on the compute node. One of the compute nodes is assigned the role of master compute node (MCN), with the other compute node(s) each assigned the role of slave compute node (SCN). Active TPM provisioning in each SCN produces key information that is sent to the MCN to enable use of a challenge/response exchange with each SCN. A quote request is sent from the MCN to each SCN. In response to receiving the quote request, a quote response is sent from each respective SCN to the MCN, wherein the quote response includes slave TPM content along with TPM logs and associated signatures. In some embodiments, the MCN may utilize information contained in the quote response to provide authentication of the slave nodes at least to some extent. In other embodiments, a trusted third party via remote attestation with the MCN at a later time may utilize information collected by the MCN from all the SCNs' quote responses to provide authentication of the slave nodes to the extent desired/required.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
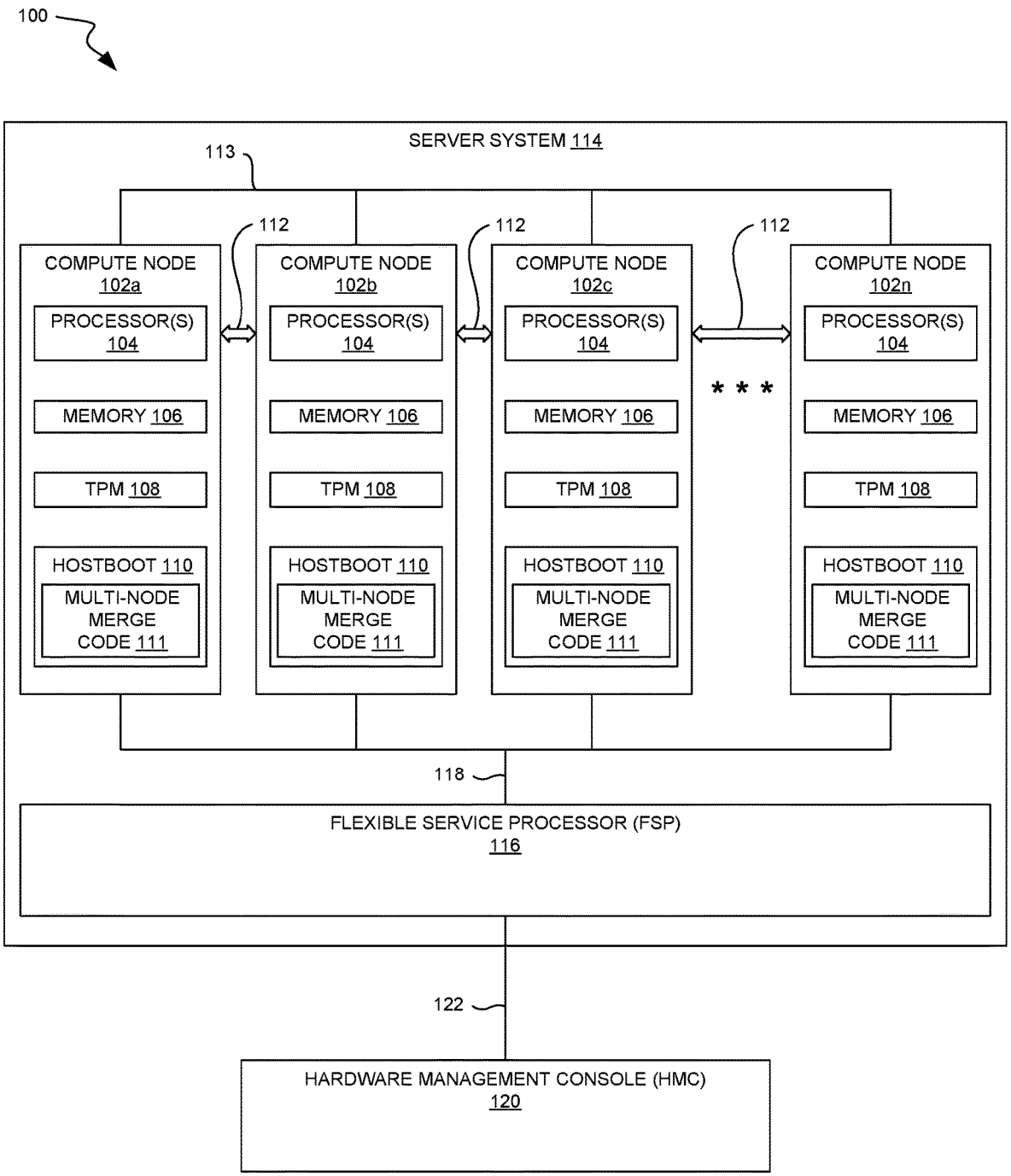
FIG. 1 is a block diagram of multiple compute nodes forming a single multi-node system, in accordance with one or more embodiments.

An authentication protocol with active trusted platform module (TPM) provisioning for merging multiple compute nodes with multiple TPMs, in accordance with one or more embodiments, makes use of a hardware secure channel established between compute nodes for firmware message passing as part of the physical configuration of the compute nodes to be merged. The hardware secure channel may be employed in lieu of firmware message passing between compute nodes through an untrusted service processor conduit. One skilled in the art will appreciate, however, that the authentication protocol, in accordance with one or more other embodiments, may be adapted (e.g., with additional protocol steps to maintain message integrity) for implementation where firmware message passing between compute nodes occurs through an untrusted service processor conduit or through any other untrusted connection.

Also, in accordance with one or more embodiments, a secure channel between nodes is utilized in an active TPM provisioning process (e.g., operation set 410 in FIG. 4, FIG. 5B, and FIG. 6A), a challenge/response exchange (e.g., operation set 415 in FIG. 4, FIG. 5C, and FIG. 6B), and to exchange an initial secret (e.g., operation 552 in FIG. 5D and FIG. 6C) in a quote request/response flow (e.g., operation set 420 in FIG. 4, FIG. 5D, and FIG. 6C) as a prelude to further node-to-node messaging. Further node-to-node messaging subsequent to exchange of the initial secret may use the secure channel, in accordance with some embodiments. In accordance with other embodiments, further node-to-node messaging subsequent to exchange of the initial secret may use a less secure channel (e.g., an untrusted service processor conduit) that may have more robust data throughput than the secure channel.

In accordance with one or more embodiments, an authentication protocol with active TPM provisioning for merging multiple compute nodes with multiple TPMs intentionally minimizes the amount of authentication and certificate handling work done on the master and slave compute nodes because the protocol is required to run in low level firmware that provides a limited environment for certificate handling and a less than full TPM command suite.

Node-to-node messages are exchanged pursuant to an authentication protocol with active TPM provisioning for merging multiple compute nodes with multiple TPMs, in accordance with one or more embodiments, low in the firmware stack before Inter-node memory buses are coupled or system network connectivity exists.

An authentication protocol with active TPM provisioning for merging multiple compute nodes with multiple TPMs, in accordance with one or more embodiments, establishes a set of active TPM provisioning operations followed by a quote request/response flow between an assigned master compute node and all slave compute nodes that participate in the merge process. In accordance with one or more embodiments, the active TPM provisioning operations create or produce, for each slave compute node, the minimum necessary key information that is necessary to return to the master compute node to enable use of a challenge/response (encrypted nonce) exchange with each slave compute node. This subsequent challenge/response is used, in accordance with one or more embodiments, to authenticate each slave compute node TPM as the holder of the private part of the encryption key used. If the challenge is satisfied, the master compute node will issue a quote request, in accordance with one or more embodiments, to gather each slave compute node's TPM content, along with the TPM event logs and associated signatures to enable the master compute node (or, alternatively, a trusted party via remote authentication) to provide authentication of the slave compute nodes to the extent desired/required.

This quote request/response flow, in accordance with one or more embodiments, allows for the master compute node to securely collect the necessary information from the slave compute node TPM(s). This information, in accordance with one or more embodiments, is managed on the master compute node upon receipt. In accordance with one or more embodiments, the hash of the quote response is extended to the master compute node's TPM(s) and the full quote response blob (not the hash of the quote response) is logged to the master compute node's TPM event log and information fields cached in protected memory locally on the master compute node. The necessary information may be subsequently provided to a remote trusted third party via what is a well-known remote attestation process to enable the third party to confirm authenticity of the slave compute nodes post initial program load (IPL) but before secure workloads are loaded. Alternatively, the master compute node firmware may be charged with performing this confirmation of node authenticity.

In accordance with one or more embodiments, firmware IPL history is exchanged between the compute nodes in the multi-node system in such a way that any TPM in the multi-node system can take on the role of the master TPM (e.g., any compute node in the multi-node system can be assigned as the master compute node and any TPM on the assigned master compute node may take on the role of the master TPM) and can provide full attestable history (current IPL and any concurrent firmware updates, but not previous IPLs) of the firmware run on that system to a remote trusted third party.

An authentication protocol with active TPM provisioning for merging multiple compute nodes with multiple TPMs, in accordance with one or more embodiments, enhances the prior art by addressing the threats cited earlier for the multi-node server environment including spoofing (node impersonation if lacking authentication of nodes), tampering (integrity of node protocol messages thereby exposing threat of relay and replay attacks by a malicious service processor or exploited hypervisor), information disclosure, denial of service, multiple master attacks, and code and TPM event log integrity issues.

In accordance with one or more embodiments, an authentication protocol with active TPM provisioning for merging multiple compute nodes with multiple TPMs may be implemented in either an environment that utilizes a single TPM per compute node or an environment that utilizes multiple TPMs per compute node (e.g., each compute node may include a primary TPM and an alternate TPM synchronized with the local primary TPM (identically extended by firmware, and being associated with a common TPM event log)).

An authentication protocol with active TPM provisioning for merging multiple compute nodes with multiple TPMs, in accordance with one or more embodiments, is implemented while merging compute nodes at system boot. One skilled in the art will appreciate, however, that the authentication protocol, in accordance with one or more other embodiments, may be adapted for implementation at other times while merging compute nodes.

Although active TPM provisioning can increase the amount of authentication and certificate handling work that must be done on the master and slave compute nodes (as compared to solutions in which TPMs are provided with pre-provisioned node certificates), the inclusion of active TPM provisioning in an authentication protocol for merging multiple compute nodes with multiple TPMs, in accordance with one or more embodiments, can be highly advantageous. For example, unlike solutions in which the TPMs are provided with pre-provisioned node certificates, active TPM provisioning requires neither an Internet connection nor the consumption of additional TPM non-volatile random access memory (NVMAM) space for pre-provisioned node certificates. Solutions in which the TPMs are provided with pre-provisioned node certificates require an internet connection (e.g., when creating an attestation key (AK) certificate for each TPM at manufacturing TPM provisioning time) and consume additional TPM NVRAM space to accommodate the pre-provisioned node certificates.

Before continuing it is helpful to briefly discuss trusted platform modules (TPMs), platform configuration registers (PCRs), integrity measurements, quotes, remote attestation, and core root of trust for measurement (CRTM). IBM® OpenPOWER servers provide a firmware-level security feature known as Trusted Boot. IBM® is a registered trademark of International Business Machines Corporation ("IBM") in the United States. Trusted Boot helps a user to verify that the user's server is running only authorized firmware components from IBM or another trusted vendor. This allows the user to detect and take corrective action in case of a boot code cyberattack—that is, any attempt to replace the user's trusted firmware with malicious code. If an attacker can inject malicious code at the firmware level, no amount of protection within the operating system can prevent the attacker from gaining control of the user's system.

Trusted Boot works by requiring the firmware to take a series of recordings, or measurements, as the server boots. Each measurement is a secure hash (e.g., SHA256 or SHA512) of a particular boot code component (typically, an executable firmware image) as the component is loaded from flash memory, before the component runs on the system processor. Each executable image measures the next before passing control to that next image. The measurement may also be a hash of some important configuration data, such as the properties that determine the server's default boot device. A "hash" or "hash function", such as the secure hash algorithms (SHA256 and SHA512), is a well-defined procedure or mathematical function that turns some kind of data into a relatively small integer. A good hash function will be deterministic, meaning the two identical or equivalent inputs will generate the same hash value. In accordance with TCG specifications, if the hash of certain program code is different than the previous hash of that program code, then the code has been altered in some way and should not be trusted.

The measurements are recorded in a dedicated security processor known as the trusted platform module (TPM). The TPM ensures that the measurements are stored securely, in a manner where they cannot be erased (until the next reboot) and cannot be easily counterfeited. The TPM has several dedicated registers, which are called platform configuration registers (PCRs), allocated to hold the measurements. Each PCR contains a cryptographic history (in the form of a hash value) of all the measurements extended to the PCR. The extend operation is used by the TPM to add a measurement to a PCR. The TPM ensures that a specific series of measurements, in a specific order, will always produce this same resultant value—the digest value—of the PCR. And, it is virtually impossible to produce a given digest value without having the TPM extend that exact series of measurements, in the exact order.

After the server boots to the target OS or hypervisor, it is possible to connect the server over the network and to ask the server for a list of all PCR digest values and a list of all the measurements that were recorded by the TPM. The list of PCR digest values is called the "PCR digest list" and the list of measurements is referred to as the "boot-time measurement log" or "TPM event log". The process of asking the TPM for a signed digest (report) consisting of the requested PCR states is known as requesting a "quote". For example, an "attestation server" may request a quote from the server during a process known as "remote attestation", discussed below. The TPM neither holds nor has any awareness of the TPM event log. The TPM event log is neither secret nor protected—if the TPM event log is altered, the attestation server will not be able recreate the values of the PCRs as reported in the quote from the TPM when verifying the TPM event log by replaying the measurements and comparing the calculated PCR values to those in the quote.

When the TPM creates a quote, the TPM cryptographically signs the digest list in a manner that can be independently verified, using a key that can be validated as belonging to the unique TPM that created the quote. This key, in turn, is signed by a key that can be linked to the TPM's manufacturer or vendor. The key used to link the TPM to the TPMs vendor is known as the endorsement key (EK), and the key that is used to sign the quote is known as the attestation key (AK). The TPM generates this attestation key (AK), as discussed below, for the purpose of signing the quote.

After the quote has been retrieved from the TPM, and the endorsement key EK and attestation key AK verified, the PCR data can be used to verify that the server has booted only the expected boot code and configuration. Any deviation will create an unexpected PCR digest value (either with respect to a PCR digest value from a list of published values and/or a mismatch when attempting to replay the TPM event log's claimed measurement values) which can be detected when examining the quote. This process of retrieving and verifying a quote is known as remote attestation.

A user must be able to trust the components that create the measurements recorded in the TPM, or else the system from which the quote was received may already be compromised and could be deceptive about what was measured. This problem is solved by establishing a core root of trust for measurement (CRTM) anchored in hardware. For example, a CRTM may be created using a Secure Boot feature that adds cryptographic checks in each phase of the initial program load (IPL) process until communication with the TPM is established. The Secure Boot flow ensures the integrity of all firmware that must be run on core processors, thus preventing any unauthorized or maliciously modified firmware from running. A failure to authenticate the code at any point prevents the IPL process from reaching completion.

At this point, it is helpful to briefly discuss how the TPM handles keys in the context of remote attestation. Every TPM contains a unique, burned—in endorsement key (EK) (or Endorsement Primary Seed and an EK certificate from which an EK public key can be re-created) that is signed by a Root Endorsement Key belonging to the TPM vendor. This signature over the (public part) of the TPM's EK is stored in an X509 certificate, pre-installed in the TPM, and this EK certificate is one of the first bits of information the client server sends to the attestation server when sending a quote. The Root EK certificate is a publicly available X509 certificate that can be obtained from the TPM vendor and imported into the attestation server truststore. When the client server sends the client server's EK certificate, the attestation server can easily check the client server's EK certificate against the root EK certificate and verify that this key belongs to a TPM manufactured by this vendor. Note that the attestation server does not yet know this key belongs to any particular TPM, only one from this vendor.

The TPM does not use the EK to sign the quote; the TPM generates an attestation key (AK) for this purpose. The client server sends the public part of this AK to the attestation server at the same time the client server sends the client server's EK certificate.

It is important to note that the private parts of these two keys, the EK and the AK, are contained within the TPM and cannot be extracted. These keys can only be used by the TPM and only in a manner intended by the TPM designer. This is why it is important to know that the TPM came from a trusted vendor. If the keys could be extracted and used externally, it would be easy for another TPM-like function to masquerade as this TPM and destroy the authenticity of the quoted information.

After the attestation server has received the public parts of the EK and AK, the attestation server can create a challenge to verify whether the client server's TPM is truly the holder of these keys. This allows the client server to complete what is referred to as the enrollment. In essence, the challenge is constructed so that the client server must have the private parts of both keys to complete the challenge. Additionally, the challenge is performed in a way that can only be completed on the client server's TPM; that is, the challenge cannot be performed in software on the client server.

Contained in the challenge is a secret encrypted with the client server's public EK. Also contained in the challenge is a reference to the client server's public AK, known as the key name. The client server's TPM will reject the challenge if the name does not match the client server's true AK. After the client server decrypts and returns the secret, the attestation server can be sure that the client server has performed the operation on a genuine, trusted vendor's TPM and that the attestation key (AK) can be trusted. When this is completed, the client server is enrolled at the attestation server.

FIGS. 1-4, FIGS. 5A-5D, and FIGS. 6A-6C describe embodiments of the present invention implemented in a multi-node system that utilizes the Secure Boot feature. For Secure Boot, the CRTM code is based on self boot engine/Hostboot (SBE/HB). One skilled in the art will appreciate, however, that aspects of the present invention may be utilized in conjunction with other root of trust for measurement (RTM) models, such as a static RTM model. In a static RTM model, the CRTM code, which is typically included in the basic input output system (BIOS), must be run first when the server or the physical hardware environment is powered on, or when the server or physical hardware environment is reset. Aspects of the present invention may be adapted for implementation in a multi-node system that utilizes a RTM model other than Secure Boot, such as a static RTM model.

FIG. 1 is a block diagram of multiple compute nodes 102a-n forming a single multiple-node system 100 (also known as a "scale up server" or a "multi-node SMP server"), in accordance with one or more embodiments. A "multi-node SMP server" is a symmetric multiprocessing (SMP) server having multiple compute nodes in which multiple processors share the system memory. Many of the components of the compute nodes 102a-n (such as those discussed below with reference to the compute node 200 of FIG. 2, the compute nodes Node_0, Node_1 of FIG. 3, and the computing platform 700 of FIG. 7, which may be used to implement one or more of the compute nodes 102a-n) are not shown in FIG. 1 in order to highlight components that implement one or more embodiments. It should be recognized that the compute nodes 102a-n may have, but are not required to have, identical hardware and perhaps also identical firmware and software. As shown, the first compute node (COMPUTE NODE 102a), the second compute node (COMPUTE NODE 102b), the third compute node (COMPUTE NODE 102c), and the n-th compute node (COMPUTE NODE 102n) each have one or more processors 104, memory 106, at least one trusted platform module (TPM) 108, and Hostboot code 110, although they may be different.

For example, each compute node 102a-n may include four CPUs 104 and memory 106 on a compute node motherboard (not shown), along with at least one TPM 108 (e.g., a primary TPM and an alternate TPM synchronized with the local primary TPM) and Hostboot code 110. In one or more embodiments, the four CPUs on each compute node motherboard may include a master processor and three slave processors (which may include an alternate master processor). For example, the master processor in the compute node may be physically attached to a processor NOR (PNOR) flash memory (210 in FIG. 2). Each CPU may have, for example, twelve cores (not shown). In one or more embodiments, the twelve cores of each CPU may include a primary master core and eleven slave cores (which may include an alternate master core). In one or more embodiments, a server system 114 may accommodate, for example, four compute node motherboards, each incorporating a compute node 102, as well as accommodating at least one flexible service processor (FSP) 116 (e.g., a primary FSP and a backup FSP synchronized with the primary FSP).

The compute nodes 102a-n are scaled together by a connection 112 to form a single multi-node system 100. Although four of the compute nodes 102 are shown in FIG. 1, the single multi-node system 100 may comprise any plural number (i.e., two or more) of compute nodes 102. Only one of the compute nodes 102 may be the master compute node at any one point in time, and the other compute node(s) are the slave compute nodes. The multi-node system 100 will boot, in accordance with one or more embodiments, utilizing an authentication protocol that establishes a set of active TPM provisioning operations followed by a quote request/response flow between an assigned master compute node and all slave compute nodes that participate in the merge process.

The compute nodes 102a-n may be, for example, scaled together by a scalability connection 112 to form the single multi-node system 100 using node controller/memory controller chip designs or "chip sets" that include scalability ports. The scalability ports, which are included in each compute node, are used for connecting each of the compute nodes into the single multi-node system.

A secure trusted communications channel 113, in accordance with one or more embodiments, is utilized to communicate node-to-node messages between the compute nodes to be merged (e.g., the compute nodes 102a-n) in an authentication protocol for merging those nodes. The node-to-node messages employed in the authentication protocol are sent, in accordance with one or more embodiments, via processor registers (e.g., "A-Bus" Mailbox Registers 270 in FIG. 2, described below) and the secure trusted communications channel 113. The secure trusted communications channel 113 may include, for example, one or more portions of at least one "A-Bus" (shown in FIG. 3) hardwired on the processor chips of the compute nodes and one or more portions of at least one "SMP Cable" (shown in FIG. 3), described below, directly connected between like-positioned processor chips of respective compute nodes. The node-to-node messages employed in the authentication protocol may be, for example, 8-byte transfers, with a transfer time of approximately 1-2 microseconds per 8-byte.

The compute nodes 102a-n may be connected together so as to be available for merger into the single multi-node system by using processor registers and the secure trusted communications channel 113 in the form of one or more hardwired buses (one or more portions thereof) and/or one or more secure trusted cables (one or more portions thereof) directly connected between like-positioned processor chips of respective compute nodes. The secure trusted communications channel 113 is trusted because each of the one or more buses (e.g., the "A-Bus" in FIG. 3) is hardwired on the processor chips of the compute nodes and the one or more secure trusted cables (e.g., the "SMP Cable" in FIG. 3) is/are directly connected thereto (i.e., direct processor chip connections).

The compute nodes 102a-n of the multi-node system 100 may be fully meshed, which means that there is a scalability cable and/or a secure trusted cable coupled directly between each pairing of nodes 102a-n within the multi-node system 100. Specifically, wherein there are n nodes, a fully meshed system will require (n−1)n/2 scalability and/or secure trusted cables.

As shown in FIG. 1, in one or more embodiments, all of the compute nodes 102a-n forming the single multi-node system 100 may be included in a single server system 114. In one or more other embodiments, the compute nodes forming the single multi-node system may be included in multiple server systems.

In accordance with one or more embodiments, the server system 114 may also include at least one flexible service processor (FSP) 116. A flexible service processor includes firmware that provides diagnostics, initialization, configuration, and run-time error detection and correction. The flexible service processor 116 is connected to each of the compute nodes 102a-n through a communication bus 118.

When the flexible service processor 116 selects one of the compute nodes 102a-n as the master compute node, all other compute nodes become slave compute nodes. Typically, the compute node having the lowest node ID (e.g., Node_0) is assigned as the master compute node by the flexible service processor. The flexible service processor 116 connects the managed computer system (e.g., the server system 114) to a hardware management console (HMC) 120 through a HMC to managed server connection 122.

Although the server system 114 is shown in FIG. 1 as including only a single flexible service processor (FSP) 116, additional FSPs (e.g., a backup FSP) may be included in server system 114. Similarly, although only a single hardware management console (HMC) 120 is shown in FIG. 1, additional HMCs (e.g., a backup HMC) may be employed as well.

Figure 2:
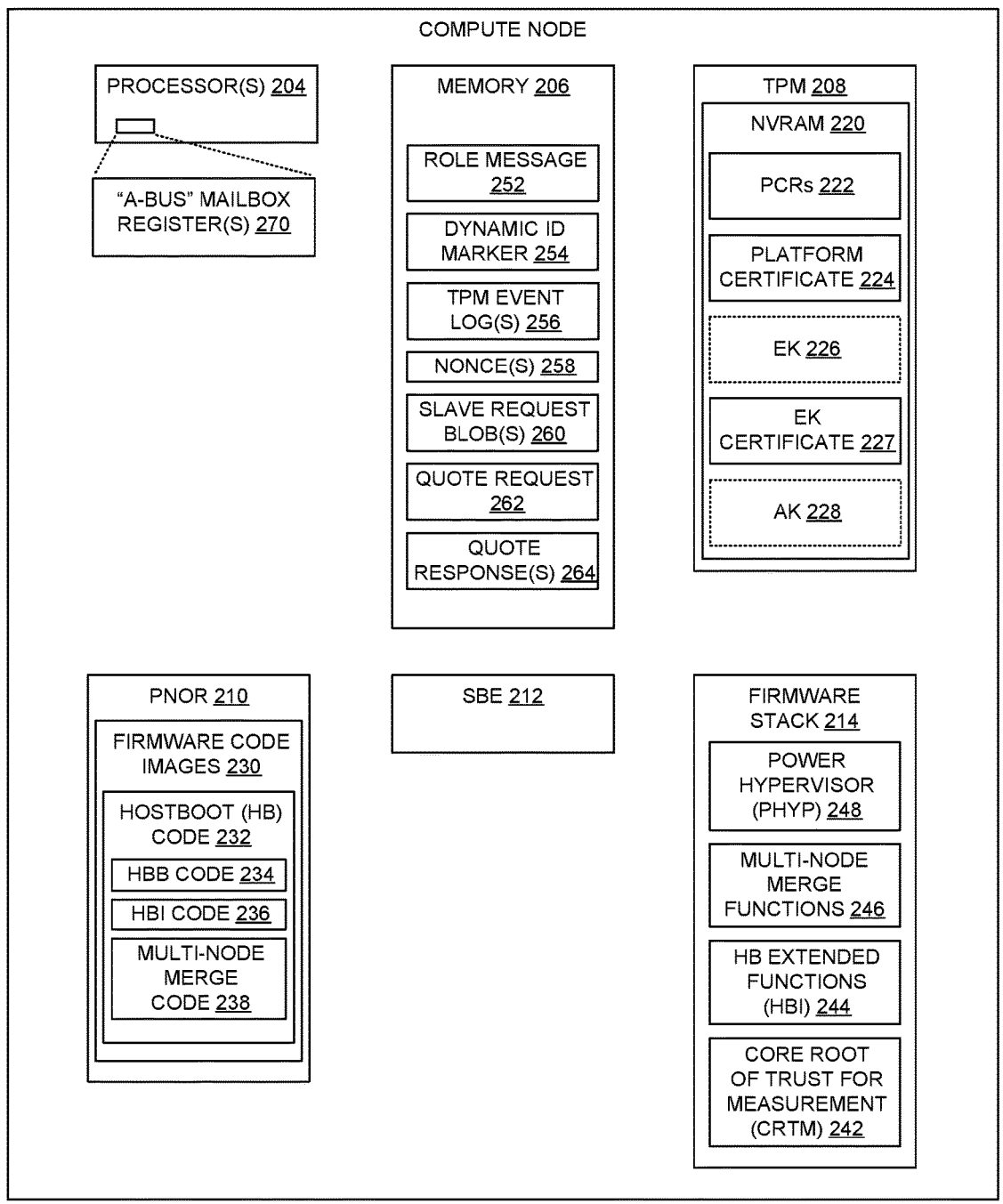
FIG. 2 is a block diagram of an illustrative compute node, in accordance with one or more embodiments.

The TPM 108 of each of the compute nodes 102a-n includes non-volatile random access memory (NVRAM) (e.g., NVRAM 220 in FIG. 2). Security settings can be stored in the NVRAM of the TPM 108, or can be stored outside of the TPM 108 (but within each of the compute nodes 102a-n) in another NVRAM.

Hostboot code 110 of each of the compute nodes 102a-n is firmware that runs on the host processors to initialize the memory and processor bus during initial program load (IPL). For example, Hostboot firmware performs memory initialization and other tasks in IBM® POWER® based systems. IBM® and POWER® are registered trademarks of International Business Machines Corporation ("IBM") in the United States. Hostboot code 110, in accordance with one or more embodiments, runs during IPL to initialize processors and memory and buses, and actually goes away before hypervisors and OSs run. A component of Hostboot firmware distinct from Hostboot code 110, known as Hostboot Runtime Services, provides runtime services. In accordance with one or more embodiments, Hostboot code 110 includes multi-node merge code 111 (e.g., 238 in FIG. 2) that implements an authentication protocol (or portions thereof) with active TPM provisioning for merging multiple compute nodes (e.g., compute nodes 102a-n) with multiple TPMs 108.

FIG. 2 is a block diagram of an illustrative compute node 202, in accordance with one or more embodiments. One or more compute nodes 102a-n of FIG. 1 may include some or all of the components of the compute node 202 illustrated in FIG. 2.

As illustrated, the compute node 202 may include one or more processors 204, memory 206, at least one trusted platform module (TPM) 208, a processor NOR (PNOR) flash memory 210 (which contains firmware images 230, including Hostboot code 232), a self boot engine (SBE) 212, and a firmware stack 214. The one or more processors 204, the memory 206, the at least one TPM 208, and Hostboot code 232 of FIG. 2 may respectively correspond to the one or more processors 104, the memory 106, the at least one TPM 108, and Hostboot code 110 illustrated in FIG. 1.

The one or more processors 204 may include, for example, four CPUs. These four CPUs may include, for example, a master processor and three slave processors (which may include an alternate master processor). For example, the master processor (and the alternate master processor) in the compute node 202 may be physically attached to PNOR flash memory 210 by, for example, a serial peripheral interface (SPI) bus. Each CPU may have, for example, twelve cores (not shown). In one or more embodiments, the twelve cores of each CPU may include a primary master core and eleven slave cores (which may include an alternate master core).

The memory 206 can include computer readable media in the form of non-volatile memory, such as a non-volatile random access memory (NVRAM), and volatile memory, such as random access memory (RAM) and/or cache memory. The memory 206 may further include other removable/non-removable, volatile/non-volatile computer system storage media. In accordance with one or more embodiments, the memory 206 may be employed to store, at least temporarily, a copy of programming instructions implementing the method 400 of FIG. 4 (or portions thereof), including one or more of operation sets 410, 415, and 420 (or portions thereof) that make up authentication protocol 425. Also, in accordance with one or more embodiments, the memory 206 may be employed to store, at least temporarily, information (e.g., one or more FSP-to-node messages, one or more node-to-node messages, one or more TPM event logs, one or more nonces, etc.) used in implementing the method 400 of FIG. 4, including authentication protocol 425. For example, the memory 206 may be employed to store, at least temporarily (cache), a master/slave role message 252 (or portions thereof), a Dynamic ID marker 254, one or more TPM event log(s) 256, one or more nonce(s) 258, one or more slave request blob(s) 260 (or portions thereof), a quote request 262 (or portions thereof), and one or more quote response(s) 264 (or portions thereof). A "Dynamic ID marker" is a node ID (e.g., Node_0) assigned to a compute node by a service processor (e.g., FSP 116 in FIG. 1) in a dynamic manner— accordingly, a particular compute node assigned the lowest node ID need not retain that distinction when the service processor assigns node IDs during subsequent IPLs. The memory 106 of FIG. 1 may include some or all of the components of the memory 206 illustrated in FIG. 2.

In accordance with one or more embodiments, the above-mentioned copy of programming instructions (implementing the method 400 of FIG. 4, including authentication protocol 425) and/or the above-mentioned information (used in implementing the method 400 of FIG. 4, including authentication protocol 425) may be stored, at least temporarily (cached), within protected memory of the memory 206. For example, the one or more quote response(s) 264 may be maintained in protected main system memory. Protected memory is a memory region that is accessible (read and write) only by trusted code. Also, access to protected memory may be blocked by hardware isolation mechanisms.

The at least one TPM 208 may include, for example, a single TPM as illustrated in FIG. 2, or multiple TPMs used in a redundant (non-transparent) manner, such as a primary TPM and an alternate TPM that is synchronized (i.e., driven by common Hostboot code such that extends and associated TPM log entries match) with the local primary TPM. One skilled in the art will appreciate, however, that a new TPM entails a new EK, which in turn necessitates re-enrollment. The TPM 208 includes non-volatile random access memory (NVRAM) 220. The NVRAM 220 contains platform configuration registers (PCRs) 222 and a platform certificate 224, as well as an endorsement key (EK) 226 and/or an endorsement key (EK) certificate 227. As mentioned earlier, every TPM contains a unique, burned—in endorsement key (EK) (e.g., EK 226) (or Endorsement Primary Seed and an EK certificate (e.g., EK certificate 227) from which an EK public key can be re-created) that is signed by a Root CA Key belonging to the TPM vendor. This signature over the (public part) of the TPM's EK is stored in an X509 certificate, pre-installed in the TPM, and this EK certificate (e.g., EK certificate 227) is one of the first bits of information the client server sends to the attestation server when sending a quote. The platform certificate 224 is created by the TPM 208 utilizing a network connection to a trusted certificate authority (CA) and stored in the TPM 208 at manufacturing TPM provisioning time. In addition, in accordance with one or more embodiments, the NVRAM 220 may contain a primary attestation signing key (AK) 228 (also referred to herein as a "primary attestation key" and "primary AK"). The primary AK 228, in accordance with one or more embodiments, is created by the TPM 208 during an active TPM provisioning process (e.g., operation set 410 in FIG. 4, discussed below), and may be stored in the TPM 208. The primary AK 228 is a special purpose key providing platform authentication based on TPM attestation capabilities. The at least one TPM 108 of FIG. 1 may include some or all of the components of the at least one TPM 208 illustrated in FIG. 2.

The PNOR flash memory 210 may be used to store firmware images 230, including Hostboot code 232. In accordance with one or more embodiments, all firmware, including Hostboot code 232, is stored in and loaded from the PNOR flash memory 210. The PNOR flash memory 210 may be connected to the master processor (and alternate master processor) through a serial peripheral interface (SPI) bus (not shown). In addition, the alternate master processor may have an alternate PNOR flash memory, so that the PNOR flash memory 210 is also not a single point of failure.

Hostboot code 232 is firmware that runs on the host processors to initialize the memory and processor bus during initial program load (IPL). For example, Hostboot firmware performs memory initialization and other tasks in IBM® POWER® based systems. IBM® and POWER® are registered trademarks of International Business Machines Corporation ("IBM") in the United States. Hostboot code 232 may include various conventional components such as initial Hostboot base (HBB) code 234 and Hostboot extended (HBI) code 236. Hostboot code 232, in accordance with one or more embodiments, runs during IPL to initialize processors and memory and buses, and actually goes away before hypervisors and OSs run. A component of Hostboot firmware distinct from Hostboot code 232, known as Hostboot Runtime Services, provides runtime services. Also, in accordance with one or more embodiments, Hostboot code 232 may include multi-node merge code 238 that implements an authentication protocol with active TPM provisioning for merging multiple compute nodes (e.g., compute nodes 102a-n in FIG. 1) with multiple TPMs 208. Hostboot code 110 of FIG. 1 may include some or all of the components of Hostboot code 232 illustrated in FIG. 2.

The self boot engine (SBE) 212 is part of the power on reset engine (PORE) that is used for initializing the processor chip to run Hostboot procedures. A PORE is a processor engine that initializes various other hardware entities using a simple instruction image. The SBE 212 may, for example, reside in and load from the host POWER8® master processor's on-chip one-time programmable read only memory (OTPROM). POWER8® is a registered trademark International Business Machines Corporation ("IBM") in the United States. Because SBE 212 resides in the OTPROM, it is immutable and cannot be overwritten by an attacker.

The OTPROM code provides an entry point to another executable SBE image stored in a serial electrically erasable programmable read only memory (SEEPROM) located on the POWERS® processor module. This SBE now begins loading additional executable images from the processor NOR (PNOR) flash memory 210. The first component to be loaded is the Hostboot code 232. The Hostboot code 232 is the first firmware component capable of performing an extend operation to the TPM 208, and Trusted Boot measurements start there.

In accordance with one or more embodiments, a trusted processor register may be used to direct communications (i.e., node-to-node messages) between the multi-node merge code 238 (or other part of Hostboot code 232) on the master compute node and the multi-node merge code 238 (or other part of Hostboot code 232) on each slave compute node. A non-limiting example of a trusted processor register is a trusted "A-Bus" Mailbox Register, which is an on-chip processor register of the processor(s) 204, that provides direct physical wires between like-positioned processors on respective compute nodes (through the secure trusted communications channel (113 in FIG. 1 and "Secure Channel" in FIG. 3, described below)) providing bi-directional 8-byte data transfers.

Each of the processor(s) 204, in accordance with one or more embodiments, includes at least one on-chip trusted processor register shown as "A-Bus" Mailbox Register 270. The multi-node merge code 238 (or other part of Hostboot code 232) on the master compute node may selectively configure the trusted "A-Bus" Mailbox Register 270 on the master compute node to direct a node-to-node message (e.g., a Quote Request, described below) from the multi-node merge code 238 (or other part of Hostboot code 232) on the master compute node to the multi-node merge code 238 (or other part of Hostboot code 232) on a particular one of the slave compute node(s). The multi-node merge code 238 (or other part of Hostboot code 232) on each slave compute node may selectively configure the trusted "A-Bus" Mailbox Register 270 on that slave compute node to direct a node-to-node message (e.g., a Quote Response, described below) from the multi-node merge code 238 (or other part of Hostboot code 232) on that slave compute node to the multi-node merge code 238 (or other part of Hostboot code 232) on the master compute node.

The firmware stack 214 may include, for example, a Core Root of Trust for Measurement (CRTM) 242, HB extended functions (HBI) 244, multi-node merge functions 246, and POWER Hypervisor™ (PHYP) 248. POWER Hypervisor™ is a trademark/common law mark of International Business Machines Corporation ("IBM") in the United States. In accordance with one or more embodiments, multi-node merge code 238 is run on core processors (along with the other components of Hostboot code 232) to provide the multi-node merge functions 246 in the firmware stack 214. While booting, in accordance with one or more embodiments, there is a like instance of Hostboot on each compute node. Once the inter-node buses are trained and a single memory space is established, a single instance of PHYP is loaded which serves all the compute nodes. The like instance of Hostboot on each compute node goes away once PHYP is given control. The components of the firmware stack 214 illustrated in FIG. 2 are illustrative, and not limiting.

To create the Core Root of Trust for Measurement (CRTM) 242, in accordance with one or more embodiments, a Secure Boot feature is used that adds cryptographic checks in each phase of the IPL process until communication with the TPM is established. Secure Boot ensures the integrity of all firmware that must be run on core processors, thus preventing any unauthorized or maliciously modified firmware from running. A failure to authenticate the code at any point prevents the IPL process from reaching its completion. For example, in the multi-node system 100 of FIG. 1, each compute node 102a-n in which such a failure occurs will not send "an IPL compete" message to the FSP 116 (e.g., at operation 504 of FIG. 5A, described below).

Figure 3:
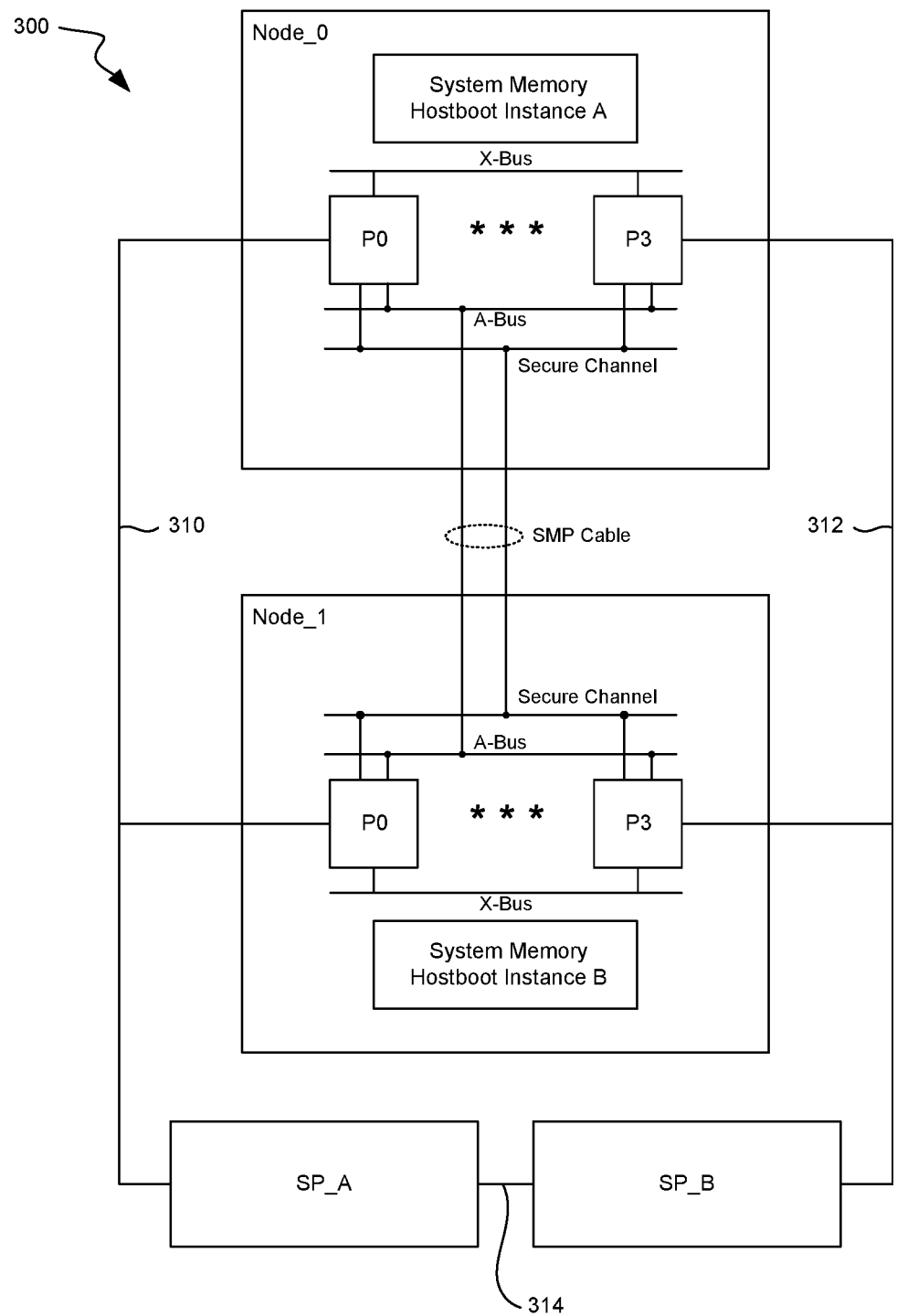
FIG. 3 is a block diagram of two compute nodes forming a single multi-node system, in accordance with one or more embodiments.

FIG. 3 is a block diagram of two compute nodes (i.e., Node_0 and Node_1) forming a single multi-node system 300, in accordance with one or more embodiments. Each of these compute nodes includes four processors (P0, P1, P2, and P3), of which only two processors (i.e., P0 and P3) are shown in FIG. 3 for the sake of clarity. The processors within each compute node illustrated in FIG. 3 are connected by multiple sets of buses, such as an X-Bus and an A-Bus. The X-Bus connects the processors to each other locally within each compute node. The A-Bus, on the other hand, connects the processors within each compute node to each other and to the processors within the other compute node via one or more SMP cables. SMP cables are direct processor chip connections. Multiple sets of buses, including the A-Bus, may be connected by one or more SMP cables.

In accordance with one or more embodiments, the secure channel may comprise an SMP cable directly connected between like-positioned processor chips. For example, the secure channel may be a small portion of the SMP cable (e.g., one or two wires of the SMP cable). In accordance with one or more embodiments, the secure channel may be one or more direct physical wires between like-positioned processors on the respective compute nodes configured to provide bi-directional 8-byte data transfers. The A-Bus may be controlled by one or more processor registers (e.g., "A-Bus Mailbox Register(s)" 270 in FIG. 2). "A-Bus Mailbox Registers" are on-processor registers connected between the compute nodes by SMP cables. The secure channel is trusted because the A-Bus is hardwired on the processor chips of the compute nodes and the SMP cables are directly connected thereto (i.e., direct processor chip connections).

As illustrated in FIG. 3, the compute nodes may each comprise an instance of Hostboot loaded into system memory shared by the compute nodes.

As also illustrated in FIG. 3, two service processors (i.e., SP_A and SP_B) may be connected to the compute nodes using two communication buses 310, 312, respectively. One service processor (e.g., SP_A) may be a primary service processor, and the other service processor (e.g., SP_B) may be a backup service processor. The primary service processor may utilize one of the communication buses (e.g., 310). The backup service processor may utilize the other one of the communication buses (e.g., 312). The service processors SP_A, SP_B may communicate with each other using a connection 314.

One or more components of the multi-node system 100 illustrated in FIG. 1 may correspond with one or more components of the multi-node system 300 of FIG. 3. For example, the secure trusted communications channel 113 of the multi-node system 100 illustrated in FIG. 1 may correspond with the secure channel of the multi-node system 300 of FIG. 3. Likewise, one or more components of the compute node 202 illustrated in FIG. 2 may correspond with one or more components of the compute nodes (i.e., Node_0 and Node_1) of FIG. 3. For example, the memory 206 of the compute node 202 illustrated in FIG. 2 may correspond with system memory shared by the compute nodes of FIG. 3.

An authentication protocol with active TPM provisioning for merging multiple compute nodes with multiple trusted platform modules (TPMs), in accordance with one or more embodiments, is discussed below with reference to FIGS. 4, 5A-5D, and 6A-6C.

Figure 4:
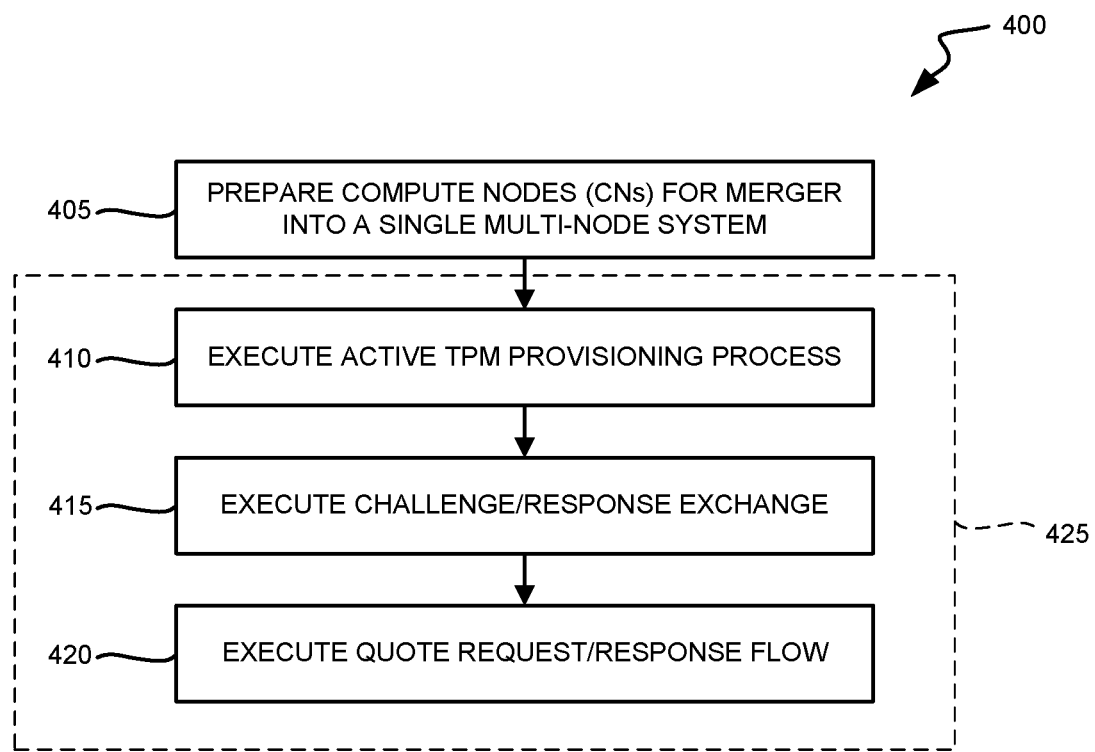
FIG. 4 is a flow diagram of an illustrative process for merging multiple compute nodes with trusted platform modules utilizing an authentication protocol with active trusted platform module provisioning, in accordance with one or more embodiments.

FIG. 4 is a flow diagram of an illustrative process 400 for merging multiple compute nodes with trusted platform modules utilizing an authentication protocol with active TPM provisioning, in accordance with one or more embodiments. The process 400 of FIG. 4 includes operation sets 405, 410, 415, and 420, of which operation sets 410, 415, and 420 together constitute an authentication protocol 425 with active TPM provisioning for merging multiple compute nodes with trusted modules, in accordance with one or more embodiments.

The process 400 begins by preparing the compute nodes for merger into a single multi-node system (operation set 405). In operation set 405, multiple compute nodes are connected so as to be available for merger into a single multi-node system, the internal IPL of each compute node to be merged is completed, each compute node to be merged sends an IPL complete message to the FSP, and then the FSP sends a master role message to the master compute node and sends a slave role message to each slave compute node. Operation set 405 is described in greater detail below with reference to FIG. 5A.

The process 400 continues by executing an active TPM provisioning process between an assigned master compute node and all slave compute nodes that participate in the merge process (operation set 410). In operation set 410, the minimum necessary key information is created or produced at each slave node and sent to the master compute node. The key information created or produced is just sufficient enough to enable use of a challenge/response (encrypted nonce) exchange between the master compute node and each slave compute node (in operation set 415, described below). Operation set 410 is described in greater detail below with reference to FIG. 5B, along with FIG. 6A (which illustrates message traffic employed in operation set 410).

The process 400 continues by executing a challenge/response exchange between the assigned master compute node and all slave compute nodes that participate in the merge process (operation set 415). In operation set 415, a challenge/response (encrypted nonce) exchange between the master compute node and each slave compute node is used to authenticate each slave compute node TPM as the holder of the private part of the encryption key used. Operation set 415 is described in greater detail below with reference to FIG. 5C, along with FIG. 6B (which illustrates message traffic employed in operation set 415).

The process 400 continues by executing a quote request/response flow between the assigned master compute node and all slave compute nodes that participate in the merge process (operation set 420). In operation set 420, if the challenge is satisfied (in operation set 415, described above), the master compute node will issue a quote request to gather each slave compute node's TPM content, along with the TPM event logs and associated signatures. This information, which is sent in the form of a quote response from each slave compute node to the master compute node, may be subsequently provided to a remote trusted third party via what is a well-known remote attestation process to enable the third party to confirm authenticity of the slave compute nodes post initial program load (IPL) but before secure workloads are loaded. Alternatively, the master compute node firmware may be charged with performing this confirmation of node authenticity. Operation set 420 is described in greater detail below with reference to FIG. 5D, along with FIG. 6C (which illustrates message traffic employed in operation set 420).

FIGS. 5A, 5B, 5C, and 5D are flow diagrams respectively illustrating in greater detail the operation sets 405, 410, 415, and 420 performed in the illustrative process 400 for merging multiple compute nodes of FIG. 4, in accordance with one or more embodiments.

Figure 5A:
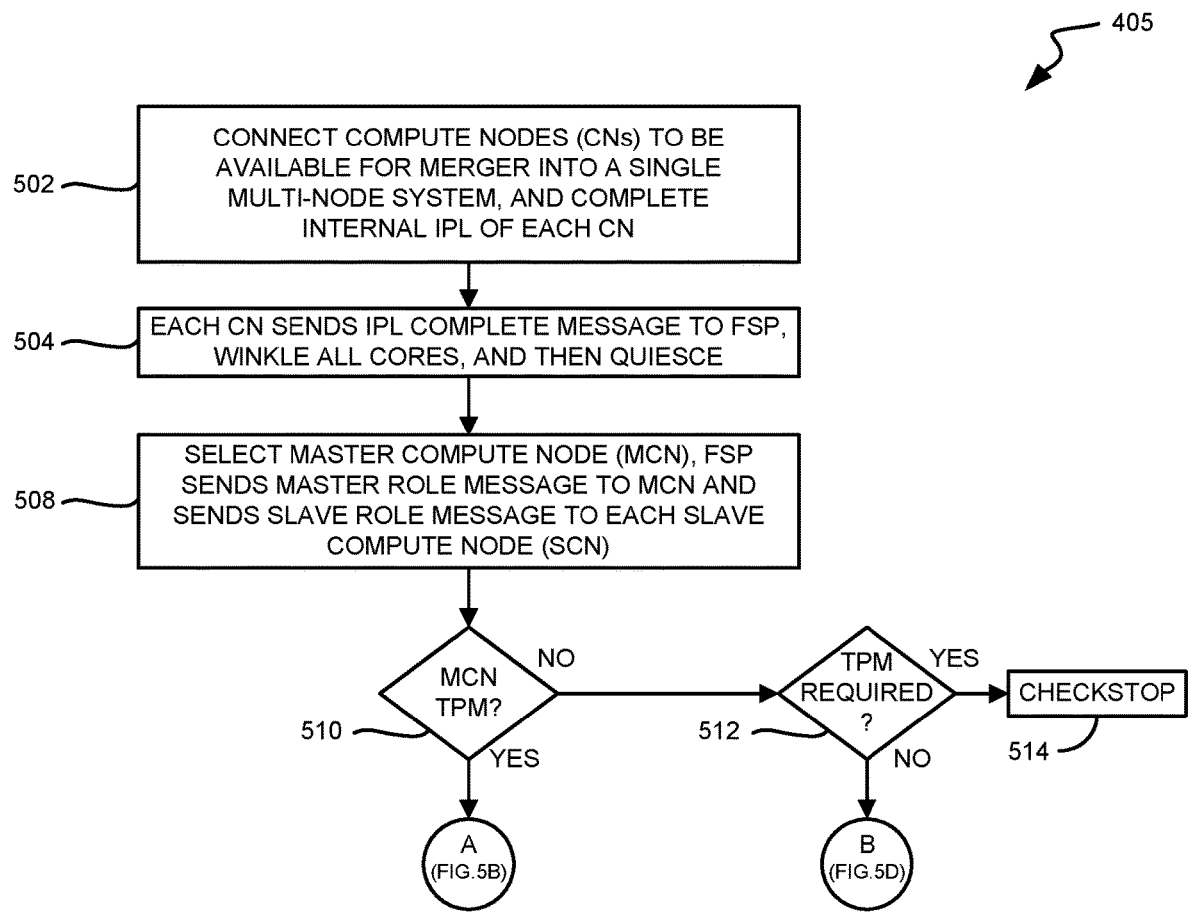
FIGS. 5A-5D are flow diagrams each respectively illustrating in greater detail an operation set performed in the illustrative process for merging multiple compute nodes of FIG. 4, in accordance with one or more embodiments.

In FIG. 5A, the operation set 405 (i.e., prepare the compute nodes for merger into a single multi-node system) performed in the illustrative process 400 for merging multiple compute nodes of FIG. 4, in accordance with one or more embodiments, is presented as operations 502-514.

Figure 5B:
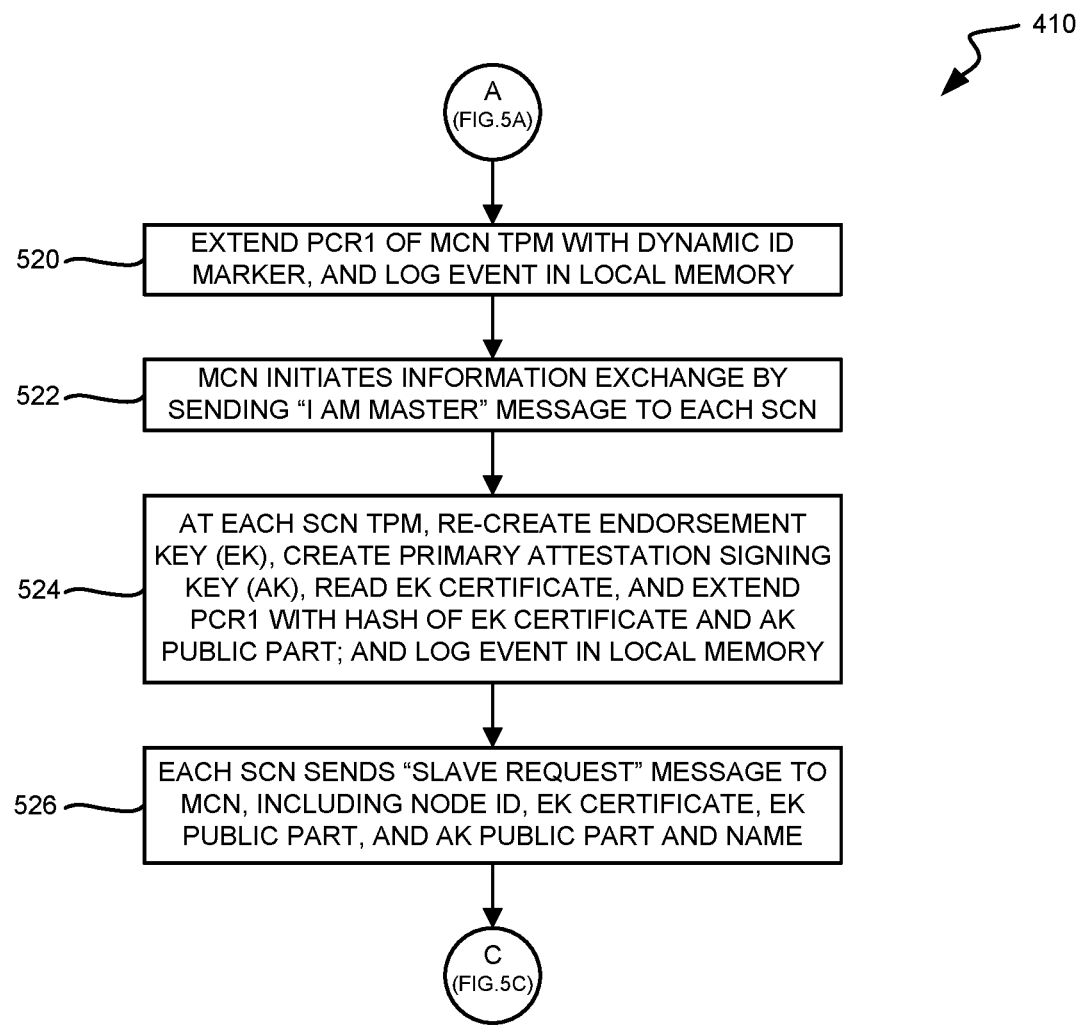

In FIG. 5B, the operation set 410 (i.e., execute active TPM provisioning process) performed in the illustrative process 400 for merging multiple compute nodes of FIG. 4, in accordance with one or more embodiments, is presented as operations 520-526.

Figure 5C:
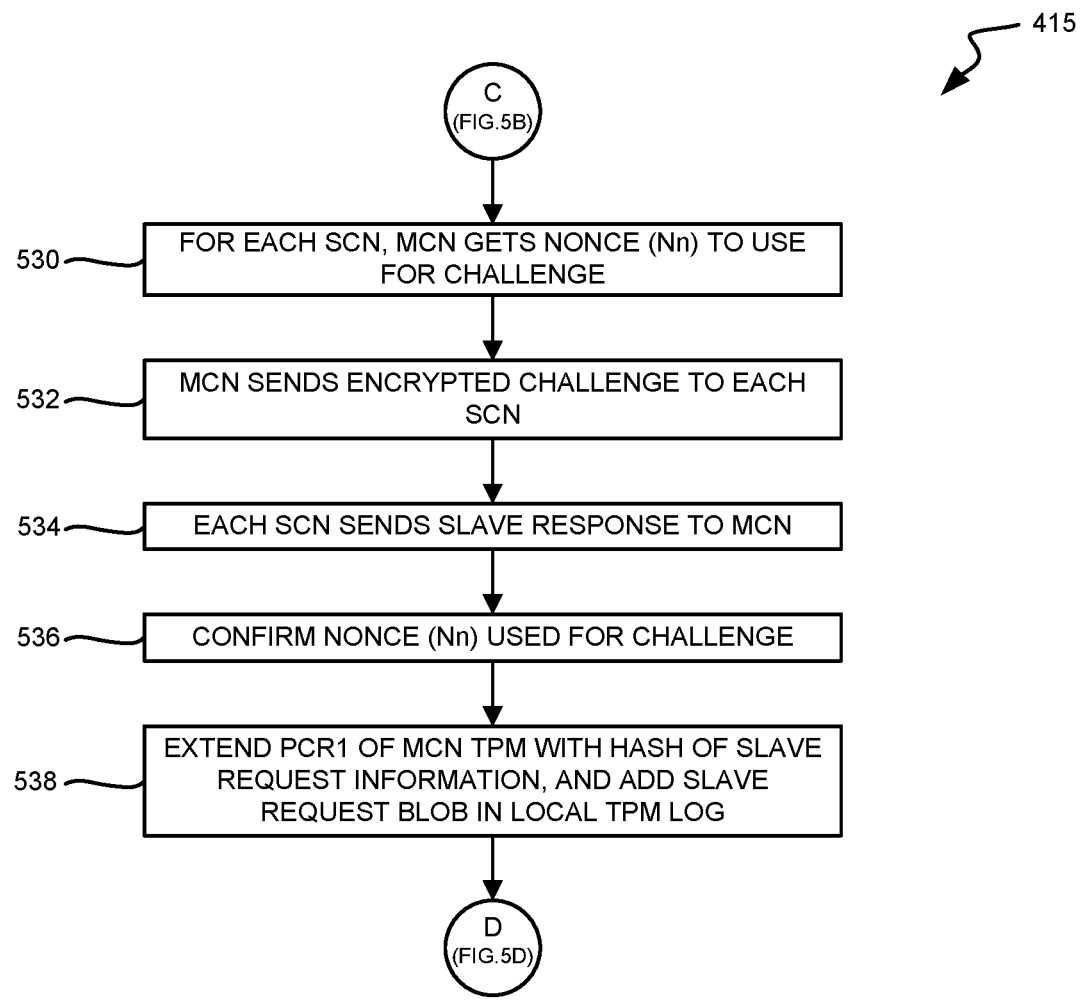

In FIG. 5C, the operation set 415 (i.e., execute challenge/response exchange) performed in the illustrative process 400 for merging multiple compute nodes of FIG. 4, in accordance with one or more embodiments, is presented as operations 530-538.

Figure 5D:
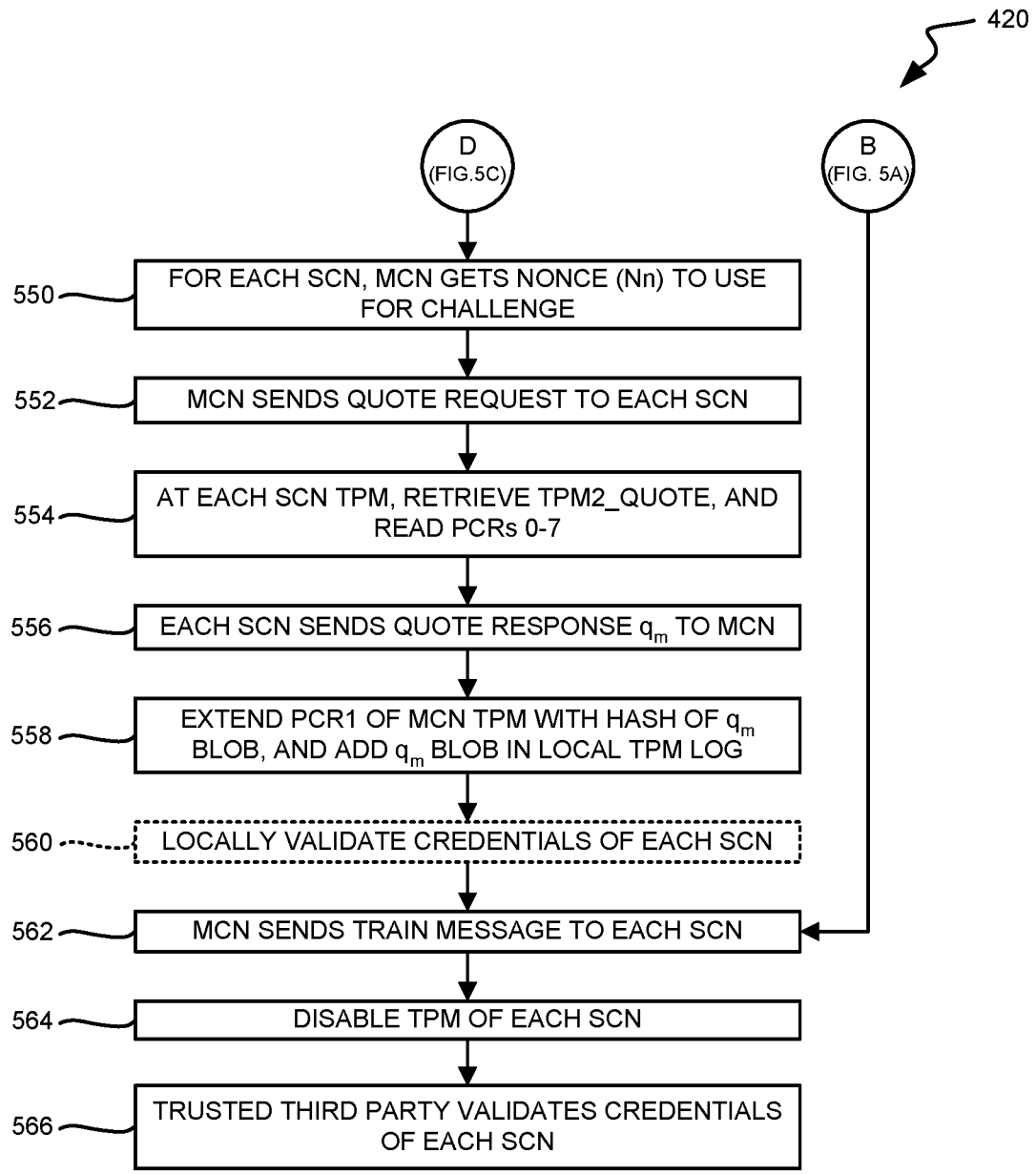

In FIG. 5D, the operation set 420 (i.e., execute quote request/response flow) performed in the illustrative process 400 for merging multiple compute nodes of FIG. 4, in accordance with one or more embodiments, is presented as operations 550-566.

Figure 6A:
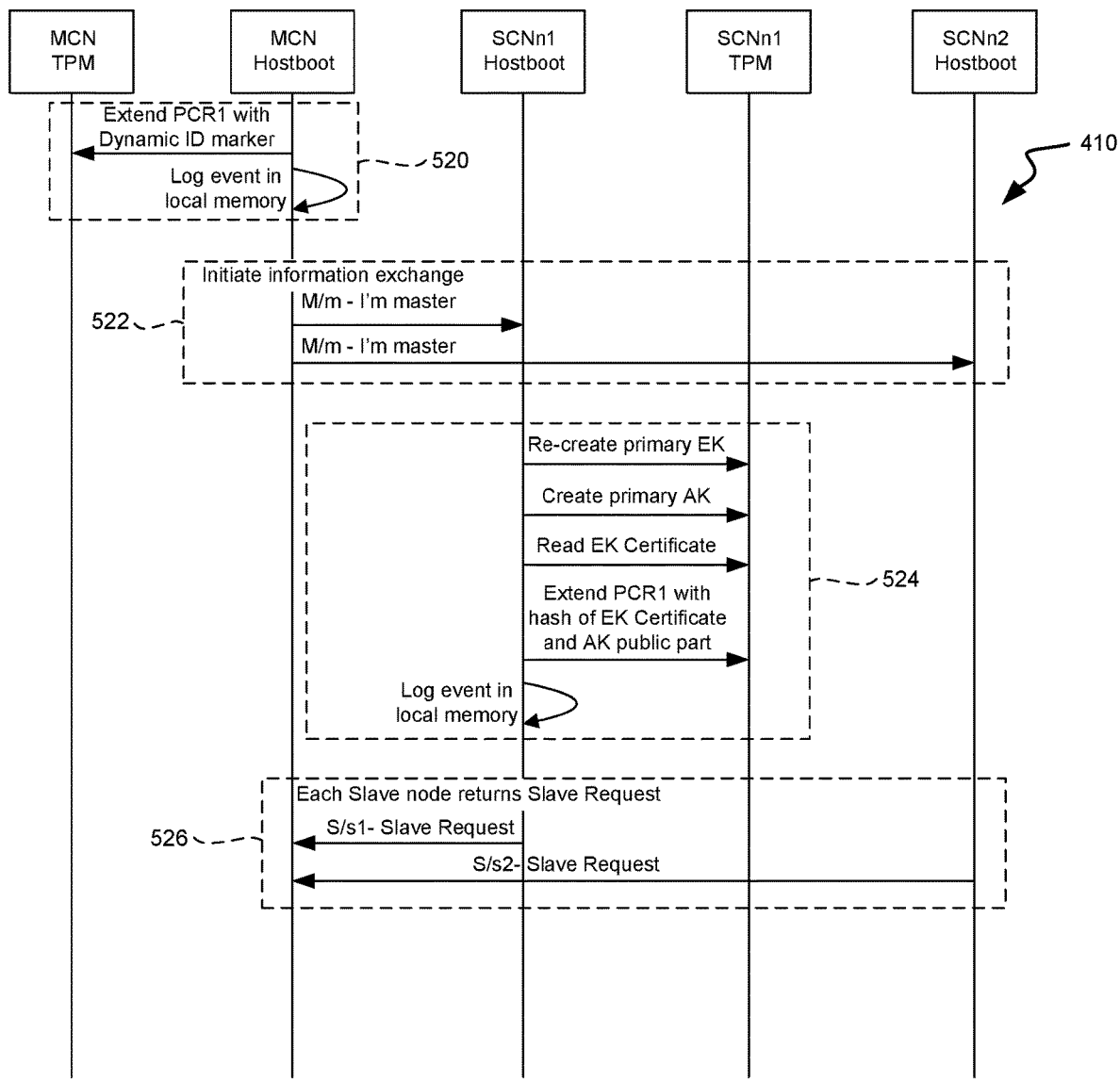
FIGS. 6A-6C are communication flow diagrams each respectively illustrating message traffic employed in an operation set performed in the illustrative process for merging multiple compute nodes of FIG. 4, in accordance with one or more embodiments.
Figure 6B:
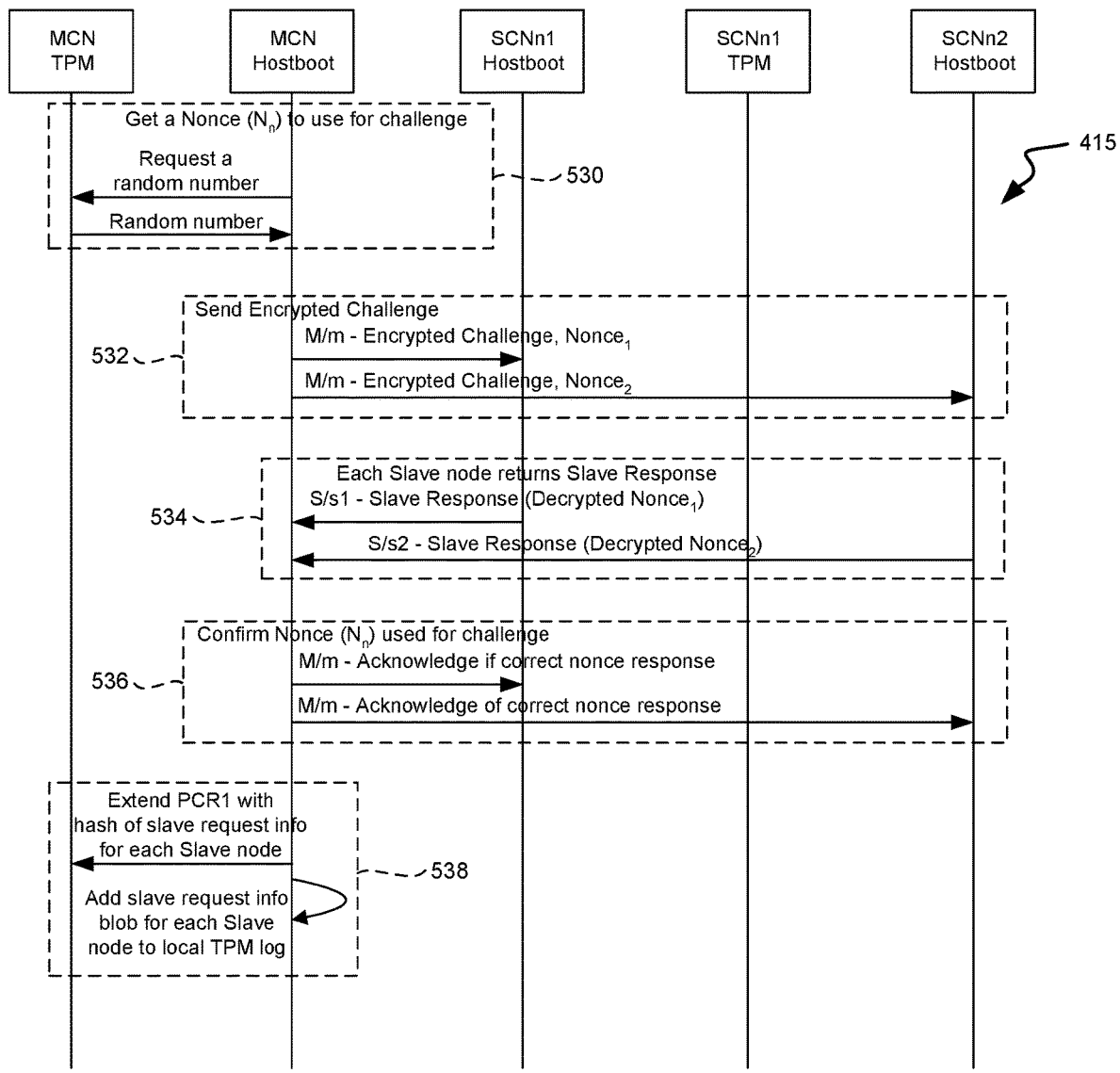
Figure 6C:
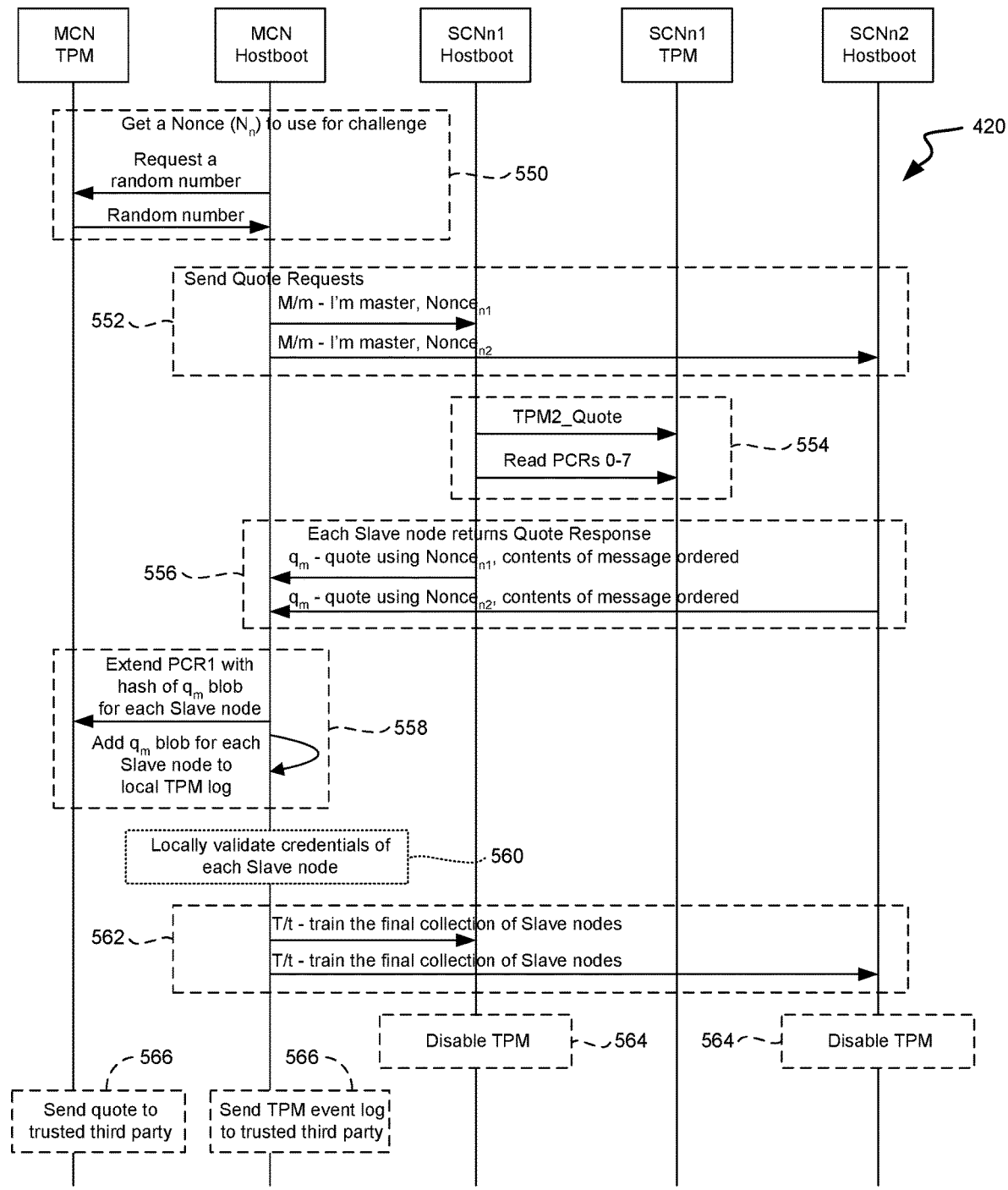

FIGS. 6A, 6B, and 6C are communication flow diagrams respectively illustrating message traffic employed in the operation sets 410, 415, and 420 performed in the illustrative process 400 for merging multiple compute nodes of FIG. 4, in accordance with one or more embodiments.

In FIG. 6A, the operation set 410 (i.e., execute active TPM provisioning process) performed in the illustrative process 400 for merging multiple compute nodes of FIG. 4, in accordance with one or more embodiments, is presented as operations 520-526, which correspond to operations 520-526 of FIG. 5B.

In FIG. 6B, the operation set 415 (i.e., execute challenge/response exchange) performed in the illustrative process 400 for merging multiple compute nodes of FIG. 4, in accordance with one or more embodiments, is presented as operations 530-538, which correspond to operations 520-526 of FIG. 5C.

In FIG. 6C, the operation set 420 (i.e., execute quote request/response flow) performed in the illustrative process 400 for merging multiple compute nodes of FIG. 4, in accordance with one or more embodiments, is presented as operations 550-566, which correspond to operations 550-566 of FIG. 5D.

In FIGS. 6A-6C, Hostboot code on the assigned master compute node is denoted as "MCN Hostboot", Hostboot code on a first slave compute node is denoted as "SCNn1 Hostboot", Hostboot code on a second slave compute node is denoted as "SCNn2 Hostboot", a trusted platform module (TPM) on the master compute node is denoted as "MCN TPM", and a TPM on the first slave compute node is denoted as "SCNn1 TPM". FIGS. 6A-6C illustrate messages between Hostboot code on the master compute node and a TPM on the master compute node (i.e., messages between "MCN Hostboot and "MCN TPM"), node-to-node messages between Hostboot code on the master compute node and Hostboot code on one or more slave compute nodes (e.g., node-to-node messages between "MCN Hostboot" and "SCNn1 Hostboot", as well as node-to-node messages between "MCN Hostboot" and "SCNn2 Hostboot"), and messages between Hostboot code on each slave compute node and a TPM on each slave compute node (e.g., messages between "SCNn1 Hostboot" and "SCNn1 TPM"), in accordance with one or more embodiments.

In FIGS. 6A-6C, nested in the "n" node-to-node messages (e.g., the "I'm master" message sent to SCNn1 Hostboot, the "I'm master" message sent to SCNn2 Hostboot, etc.), the message content may have its own message type and (payload) as follows:

M: I am master, TPM is NOT required (nonce);
m: I am master, TPM is required (nonce);
S: I am a slave, TPM is NOT required (nonce);
s: I am a slave, TPM is required (nonce);
q: quote response (certificate, log, quote);
p: propose a set of nodes to connect ( );
a: accept a proposal ( );
T: train the bus, mark all TPMs as lost, open up all the links ( );
t: train the bus, open up only links with good TPMs ( );
r: retransmit ( )<unauthenticated>; and
x: error ( )<may result in unauthenticated msg>.

For example, in FIGS. 6A-6C, with regard to the "I am master" message, the identifier "M" denotes a message type for the quote request where TPM is NOT required; whereas, the identifier "m" denotes a message type for the quote request where TPM is required.

Reference is now made to FIG. 5A, which illustrates individual operations that make up the operation set 405. In the operation set 405, the compute nodes are prepared for merger into a single multi-node system. The operation set 405 begins by connecting a plurality of compute nodes so as to be available for merger into a single multi-node system and with each compute node completing its own (i.e., internal) initial program load (IPL) (operation 502).

In operation 502, multiple compute nodes (e.g., 102a-n in FIG. 1) are connected so as to be available for merger into a single multi-node system. For example, the compute nodes may be connected together via a scalability connection (e.g., 112 in FIG. 1) and a secure trusted communications channel (e.g., 113 in FIG. 1), and connected to a flexible service processor (FSP) (e.g., 116 in FIG. 1) via a communication bus (e.g., 118 in FIG. 1).

In accordance with one or more embodiments, in each compute node, Hostboot (e.g., 232 in FIG. 2, including HBB code 234, HB extended code 236, and multi-node merge code 238) is loaded by a self boot engine (SBE) (e.g., 212 in FIG. 2) after the SBE completes its own initialization tasks (e.g., the SBE may initialize the POWER® cores). POWER® is a registered trademark of International Business Machines Corporation ("IBM") in the United States. Hostboot is the first component of the firmware stack (e.g., 214 in FIG. 2) that executes on the POWER cores, for example.

In operation 502, the master compute node does not yet know it is the master compute node. Also, in operation 502, the processor core on the master compute node is activated and Hostboot is running from real memory (not cache). In operation 502, Hostboot code on the master compute node completes the master compute node's own internal IPL and sets the "IPL complete" internal state on the master compute node.

In general, TPMs have multiple Platform Configuration Registers (PCRs) which are referred to herein as PCR0, PCR1, etc. through PCRj. PCRs are discussed in Trusted Computing Group (TCG) specifications, which are publicly available.

At the master compute node TPM, in operation 502, the following are stored: initial measurements for PCR0, PCR1, PCR4, and PCR6 (PCRs 222 in FIG. 2). Also in operation 502, at the master compute node TPM, the following are stored from manufacturing: the EK certificate 227 in FIG. 2.

In operation 502, each slave compute node does not yet know it is a slave compute node. Also, in operation 502, the processor core in each slave compute node is activated and Hostboot is running from real memory (not cache). In operation 502, Hostboot code on each slave compute node completes the slave compute node's own internal IPL and sets the "IPL complete" internal state in the slave compute node.

At each slave compute node TPM, in operation 502, the following are stored: initial measurements for PCR0, PCR1, PCR4, and PCR6 (PCRs 222 in FIG. 2). Also in operation 502, at each slave compute node TPM, the following are stored from manufacturing: the EK certificate 227 in FIG. 2.

In operation 502, the FSP (116 in FIG. 1) waits to receive an IPL complete message from each compute node.

The operation set 405 continues with each compute node (e.g., the master compute node and each slave compute node) sending an IPL complete message to the flexible service processor (FSP) (operation 504). Also, in operation 504, all the processor cores of each compute node are placed in the Winkle state, and then each compute node moves into the Quiesced state. The Winkle state is a very-low power state for a processor core where most of the processor core (and surrounding logic) is shut off. When a compute node is in Quiesced state, the compute node cannot accept system deployments.

The operation set 405 continues, upon the FSP receiving the IPL complete message from each compute node (in operation 504), by sending a master role message to the master compute node and a slave role message to each slave compute node (operation 508). At multi-node merge time, the FSP has assigned master/slave roles to participating compute nodes. The master role message sent to the master compute node may, for example, contain the following information: Your role is master; Your node number; TPM_Required setting; List of other compute nodes; and Type of IPL (cold, MPIPL). The slave role message sent to each slave compute node may, for example, contain the following information: Your role is slave; Your node number; TPM_Required setting; List of other compute nodes; and Type of IPL (cold, MPIPL).

In operation 508, these FSP-to-node messages (i.e., the master role message and the slave role messages) may be sent, for example, via a communication bus (e.g., 118 in FIG. 1). Hostboot code on the master compute node may save the master role message received from the FSP in local memory (e.g., the master role message (or portions thereof) received by the master compute node from the FSP may be saved in an information field denoted as "role message 252" in memory 206 in FIG. 2) in operation 508. Hostboot code on each slave compute node may save the slave role message received from the FSP in local memory (e.g., the slave role message (or portions thereof) received by each respective one of the slave compute nodes from the FSP may be saved in an information field denoted as "role message 252" in memory 206 in FIG. 2) in operation 508.

The operation set 405 continues with Hostboot code on the master compute node determining whether a properly functioning TPM is present on the master compute node (operation 510). In operation 510, if Hostboot code on the master compute node determines that no properly functioning TPM is present on the master compute node (operation 510=NO), the operation set 405 continues with Hostboot code on the master compute node determining whether a TPM is required (operation 512). In accordance with one or more embodiments, this determination in operation 512 is utilized to accommodate an administrator controllable setting (e.g., TPM_Required setting) for debug environments. For example, Hostboot code on the master compute node may access local memory (e.g., memory 206 in FIG. 2) to check the TPM_Required setting in the master role message received from the FSP in operation 508.

In operation 512, if Hostboot code on the master compute node determines that a TPM is required (operation 512=YES), the method 400 ends with Hostboot code on the master compute node triggering a checkstop (operation 514). A checkstop is a fatal error that is typically handled immediately or as quickly as possible. The checkstop triggered in operation 514 may be handled, for example, by freezing all processor states on the master compute node. In addition, in accordance with one or more embodiments, the checkstop triggered in operation 514 may further trigger a subsequent waking of each slave compute node. On the other hand, in operation 512, if Hostboot code on the master compute node determines that a TPM is not required (operation 512=NO) (e.g., in a debug environment), the method 400 moves on to the operation set 420 with Hostboot code on the master compute node sending a "Train" message to each slave compute node (operation 562 in FIG. 5D and FIG. 6C, discussed below).

In method 400, all node-to-node messages such as the Train message mentioned above may be sent, for example, via the trusted "A-Bus" Mailbox Registers. In accordance with one or more embodiments, the physical cabling and hardware capabilities of the system (e.g., multi-node system 100 in FIG. 1 and multi-node system 300 in FIG. 3) are such as to provide a secure trusted communications channel (e.g., 113 in FIG. 1 and "Secure Channel" in FIG. 3) between the compute nodes to be merged (e.g., the compute nodes 102a-n in FIG. 1 and compute nodes Node_0, Node_1 in FIG. 3). The secure trusted communications channel may be used for host firmware message passing to support the authentication protocol, in accordance with one or more embodiments to the present invention.

If Hostboot code on the master compute node determines in operation 510 that a properly functioning TPM is present on the master compute node (operation 510=YES), the method 400 moves on to the operation set 410 (FIG. 5B and FIG. 6A, discussed below).

In the operation set 410, low level host firmware on the master compute node operating in a limited TPM stack environment initiates an information exchange with each of the slave compute nodes. This "I am master" message triggers low level host firmware on each slave compute node to perform limited TPM operations to re-create the TPM unique endorsement key (EK—vendor and Trusted Computing Group compliance credential), create an attestation key (AK—special purpose key providing platform authentication based on TPM attestation capabilities), and read the EK certificate from TPM non-volatile space. The low level host firmware on each slave compute node then extends a hash of this collective information to the slave compute node's TPM, logs the event in the slave compute node's TPM event log, and packages the Node ID, EK certificate, EK public key, and AK public key in a response message to the master compute node.

Referring now to FIG. 5B and FIG. 6A, the operation set 410 begins with Hostboot code on the master compute node extending PCR1 of the master compute node's TPM with a Dynamic ID marker, and logging the event in local memory (operation 520). For example, in operation 520, Hostboot code on the master compute node may log the event in a TPM event log (e.g., 256 in FIG. 2) on the master compute node and in local memory (e.g., the Dynamic ID marker may be saved in an information field denoted as "Dynamic ID marker 254" in memory 206 in FIG. 2) on the master compute node.

In general, a PCR extend operation is performed on one or more of the PCRs of a TPM to update the register value to record the history of messages that are extended to the register. Rather than performing a write operation directly on a PCR, the PCR extend operation takes the original value in the PCR, concatenates the new message to it, and takes a hash to produce an updated register value. The history of messages that are extended and the order of extends can be compared later with corresponding TPM event logs.

Also, when a TPM PCR extend operation is performed, a TPM event log entry is recorded in a TPM event log (e.g., 256 in FIG. 2). The TPM event log may be used by external entities that depend on remote attestation and by host firmware during multi-node synchronization. The TPM event logs are used to reconstruct and validate PCR values against known values. The TPM event logs are not maintained by the TPM. Thus, the firmware must provide storage for the TPM event logs and provide interfaces to update the TPM event logs on PCR extends and access the TPM event logs for attestation purposes.

The operation set 410 continues with the master compute node initiating an information exchange with each slave compute node by sending an "I am master" message (denoted as "M/m—I am master" in FIG. 6A) to each slave compute node across the secure trusted communications channel (operation 522). Sending the "I am master" message may be controlled by Hostboot code on the master compute node. For example, Hostboot code on the master compute node ("MCN Hostboot" in FIG. 6A) may send an "I am master" message to Hostboot code on each slave compute node.

In response to each slave compute node receiving the "I am master" message from the master compute node in operation 522, the operation set 410 continues with Hostboot code on each slave compute node requesting the slave compute node's TPM to re-create the primary EK and to create a primary attestation signing key (AK), reading the EK certificate, extending the PCR1 of the slave compute node's TPM with a hash of the EK certificate and the public part of the AK, and adding the hash of the EK certificate and the public part of the AK to the local TPM event log (operation 524).

As note earlier, every TPM contains a unique, burned—in endorsement key (EK) (or Endorsement Primary Seed and an EK certificate from which an EK public key can be re-created) that is signed by a Root Endorsement Key belonging to the TPM vendor. In one or more embodiments, in operation 524, the slave compute node's TPM may re-create the primary EK using the Endorsement Primary Seed and the EK certificate, which may be read from the slave compute node's TPM non-volatile space (e.g., EK certificate 227 in NVRAM 220 of TPM 208 in FIG. 2). In operation 524, the primary EK, once re-created, may be saved in the slave compute node's TPM non-volatile space (e.g., EK 226 in NVRAM 220 of TPM 208 in FIG. 2) for subsequent use (e.g., operation 534 in FIG. 5C and FIG. 6B).

The primary attestation signing key (AK) may be generated by slave compute node's TPM through the use of conventional TPM commands. In operation 524, Hostboot code on each slave compute node may, for example, send a TPM2 CreatePrimary to create a primary AK signing key. The appropriate command sequence used instructs the slave compute node's TPM to generate an attestation key with a given algorithm under the endorsement hierarchy, make the AK persistent with a given AK handle, and return the public part of the AK and the AK name.

The operation set 410 continues with each slave compute node sending a Slave Request message to the master compute node across the secure communications channel (operation 526). Sending the Slave Request message may be controlled by Hostboot code on each slave compute node. For example, Hostboot code on each slave compute node may return a Slave Request message to Hostboot code on the master compute node as a structured message containing the slave compute node ID, EK certificate, the public part of the EK, the public part of the AK and the AK name. The public part of the EK will be subsequently used to encrypt a challenge (operation 532 in FIG. 5C and FIG. 6B, discussed below). Each slave compute node sends a Slave Request message to the master compute node. For example, in FIG. 6A, Hostboot code on the slave compute node n1 ("SCNn1 Hostboot" in FIG. 6A) sends a Slave Request message ("S/s1—Slave Request" in FIG. 6A) to Hostboot code on the master compute node ("MCN Hostboot" in FIG. 6A), and Hostboot code on the slave compute node n2 ("SCNn2 Hostboot" in FIG. 6A) sends a Slave Request message ("S/s2—Slave Request" in FIG. 6A) to Hostboot code on the master compute node ("MCN Hostboot" in FIG. 6A). The Slave Request message is ordered as follows:

Node ID;
EK certificate;
EK public part; and
AK public part and AK name.

In operation 526, Hostboot on the master compute node saves the Slave Request message received from each slave compute node in local memory. For example, the Slave Request message (or portions thereof) received from each respective one of the slave compute nodes may be saved in an information field denoted as "slave request blob(s) 260" in memory 206 in FIG. 2. In accordance with one or more embodiments, all validation of the key information contained in the Slave Request message received by the master compute node from each respective slave compute node is left for a trusted third party (e.g., operation 566 in FIG. 5D and FIG. 6C). In accordance with one or more other embodiments, at least a cursory level of validation of the key information contained in the Slave Request message may be performed by Hostboot code (and/or other host firmware) on the master compute node (e.g., operation 560 in FIG. 5D and FIG. 6C). Once the master compute node has received a Slave Request message from each slave compute node, the method 400 moves on to the operation set 415 (FIG. 5C and FIG. 6B, discussed below)

In the operation set 415, the master compute node performs a minimal authentication check of the slave compute nodes (verify the slave TPM is the holder of the matching EK private key) by issuing an encrypted (using the EK) nonce-based challenge to each of the slave compute nodes. Each slave compute node's response is the decrypted nonce. Upon verification of the nonce, the master compute node firmware extends a hash of the slave returned key information (i.e., the key information contained in the Slave Request message received by the master compute node from each slave compute node in operation 526 (FIG. 5B and FIG. 6A)) to the master compute node's TPM and adds the Slave Request message blob to the master compute node's TPM event log.

Referring now to FIG. 5C and FIG. 6B, the operation set 415 begins with Hostboot code on the master compute node getting a nonce (Nonce$_n$) for each slave compute node to use for challenge (operation 530). A nonce is a random number used only once in a cryptographic communication. For example, Hostboot code on the master compute node, for use relative to each respective slave compute node, may request a random number from the TPM on the master compute node. In response to the request, the TPM on the master compute node, generates a random number for use relative to each respective slave compute node and sends each respective random number to Hostboot code on the master compute node. In operation 530, Hostboot code on the master compute node may save the random number(s) received from the TPM on the master compute node in local memory (e.g., the random numbers—each associated with a respective one of the slave compute nodes—may be saved in an information field denoted as "Nonce(s) 258" in memory 206 in FIG. 2) on the master compute node.

The operation set 415 continues with the master compute node initiating a challenge process with respect to each slave compute node by sending an encrypted challenge (denoted as "M/m—Encrypted Challenge, Nonce$_1$" and "M/m—Encrypted Challenge, Nonce$_2$" in FIG. 6B) to each slave compute node across the secure trusted communications channel (operation 532). Encrypting the challenge and sending the encrypted challenge may be controlled by Hostboot code on the master compute node. For example, Hostboot code on the master compute node may utilize the master compute node's TPM to encrypt the nonce for each slave compute node using the public part of the EK contained in the Slave Request message received by the master compute node from the slave compute node in operation 526 (FIG. 5B and FIG. 6A). Hostboot code on the master compute node ("MCN Hostboot" in FIG. 6B) may send an encrypted challenge (i.e., "Encrypted Challenge, Nonce$_1$" message and "Encrypted Challenge, Nonce$_2$" message) that includes the encrypted (using EK public part) nonce associated with the slave compute node to Hostboot code on each respective slave compute node ("SCNn1 Hostboot" and "SCNn2 Hostboot" in FIG. 6B).

In response to each slave compute node receiving the encrypted challenge in operation 532, the operation set 415 continues with each slave compute node decrypting the encrypted challenge and sending a Slave Response (denoted as "S/s1—Slave Response (Decrypted Nonce$_1$)" and "S/s2—Slave Response (Decrypted Nonce$_2$)" in FIG. 6B) to the master compute node across the secure trusted communications channel (operation 534). Decrypting the encrypted challenge and sending the Slave Response may be controlled by Hostboot code on each respective slave compute node. For example, Hostboot code on each slave compute node may utilize the slave compute node's TPM to decrypt the encrypted challenge using primary EK of the slave compute node's TPM. In one or more embodiments, the primary EK of each slave compute node's TPM, which was re-created in operation 524 (FIG. 5B and FIG. 6A, discussed above), may be read from the slave compute node's TPM non-volatile space (e.g., EK 226 in NVRAM 220 of TPM 208 in FIG. 2). In one or more other embodiments, the primary EK of each slave compute node's TPM may be re-created again here in operation 534. Hostboot code on each slave compute node ("SCNn1 Hostboot" and "SCNn2 Hostboot" in FIG. 6B) may send a Slave Response (i.e., "Slave Response (Decrypted Nonce$_1$)" message and "Slave Response (Decrypted Nonce$_2$)" message) that includes the decrypted (using EK private part) nonce associated with the slave compute node to Hostboot code on the master compute node ("MCN Hostboot" in FIG. 6B).

In response to Hostboot code on the master compute node receiving the "Slave Response" from each slave compute node in operation 534, the operation set 415 continues with Hostboot code on the master compute node performing a minimal authentication check by verifying the "Slave Response" received from each slave compute node contains the correct nonce and, if correct, by sending a confirmation message (denoted as "M/m—Acknowledge if correct nonce response" in FIG. 6B) to each slave compute node across the secure trusted communications channel (operation 536). If the "Slave Response" received from one or more slave compute nodes does not contain the correct nonce, Hostboot code on the master compute node may send a message to the offending slave compute node(s) to retransmit the "Slave Response". If the retransmitted "Slave Response" received from any of the offending slave compute node(s) again does not contain the correct nonce, the method 400 ends with Hostboot code on the master compute node trigger a checkstop. Or alternatively could leave that node out of the SMP with appropriate controls in place.

Once Hostboot code on the master compute node verifies the "Slave Response" received from each slave compute node contains the correct nonce in operation 536, the operation 415 continues with Hostboot code on the master compute node extending a hash of the slave request key information (i.e., the key information contained in the "Slave Request" message received by the master compute node from each slave compute node in operation 526 (FIG. 5B and FIG. 6A, discussed above)) to the master compute node's TPM(s) PCR1 and adding the slave request key information (not hash of) to the master compute node's TPM event log (operation 538). Once Hostboot code on the master compute node extends PCR1 of the master compute node's TPM with the hash of the slave request key information and adds the entire slave request key information blob to the TPM event log, the method 400 moves on to the operation set 420 (FIG. 5D and FIG. 6C, discussed below)

In the operation set 420, low level firmware on the master compute node and on each of the slave compute nodes executes a quote request/response flow. This quote request/response flow allows for the master compute node to securely collect the necessary information from the slave compute node TPM(s). This information is managed on the master compute node upon receipt. The hash of the quote response is extended to the master compute node's TPM(s) and the full quote response blob (not the hash of the quote response) is logged to the master compute node's TPM event log and information fields cached in protected memory locally on the master compute node. The necessary information may be subsequently provided to a remote trusted third party via what is a well-known remote attestation process to enable the third party to confirm authenticity of the slave compute nodes post initial program load (IPL) but before secure workloads are loaded. Alternatively, the master compute node firmware may be charged with performing this confirmation of node authenticity.

Referring now to FIG. 5D and FIG. 6C, the operation set 420 begins with Hostboot code on the master compute node getting a nonce (Nonce$_n$) for each slave compute node to use for challenge (operation 550). A nonce is a random number used only once in a cryptographic communication. For example, Hostboot code on the master compute node, for use relative to each respective slave compute node, may request a random number from the TPM on the master compute node. In response to the request, the TPM on the master compute node, generates a random number for use relative to each respective slave compute node and sends each respective random number to Hostboot code on the master compute node. In operation 550, Hostboot code on the master compute node may save the random number(s) received from the TPM on the master compute node in local memory (e.g., the random numbers—each associated with a respective one of the slave compute nodes—may be saved in an information field denoted as "Nonce(s) 258" in memory 206 in FIG. 2) on the master compute node.

The operation set 420 continues with the master compute node initiating a quote process with respect to each slave compute node by sending a quote request (denoted as "M/m—I am master, Nonce$_{n1}$" and "M/m—I am master, Nonce$_{n2}$" in FIG. 6C) to each slave compute node across the secure trusted communications channel (operation 552). Sending the quote request may be controlled by Hostboot code on the master compute node. For example, Hostboot code on the master compute node ("MCN Hostboot" in FIG. 6C) may send a quote request (i.e., "I am master" message) to Hostboot code on each slave compute node ("SCNn1 Hostboot" and "SCNn2 Hostboot" in FIG. 6C) that includes the nonce associated with the slave compute node (for freshness), as well as the specific PCR contents requested from the slave compute node's TPM. Hostboot code on each slave compute node may save the "I am master" message received from the master compute node in local memory. For example, in operation 552, the "I am master" message (or portions thereof, such as the Nonce) received by each respective one of the slave compute nodes from the master compute node may be saved in an information field denoted as "quote request 262" (or the Nonce may be saved in an information field denoted as "Nonce(s) 258") in memory 206 in FIG. 2.

In response to each slave compute node receiving the "I am master" message from the master compute node in operation 552, the operation set 420 continues with Hostboot code on each slave compute node retrieving a signed quote from slave compute node's TPM (operation 554). In operation 554, Hostboot code on each slave compute node may, for example, send a tpm2_quote command to the slave compute node's TPM, along with a list of selected PCRs (e.g., PCR0-7). The tpm2_quote command instructs the slave compute node's TPM to provide a quote and signature for the given list of PCRs. The quote is signed by the primary AK. In some embodiments, where the primary AK created in operation 524 (FIG. 5B and FIG. 6A, described above) was stored in each slave node's TPM (e.g., the primary AK may have been saved at active TPM provisioning time in an information field denoted as "AK 228" in NVRAM 220 of the slave compute node's TPM 208 in FIG. 2), Hostboot code on each slave compute node requests the slave compute node's TPM to read the saved primary AK in operation 554. In other embodiments, Hostboot code on each slave compute node requests the slave compute node's TPM to re-create the primary AK.

The operation set 420 continues with each slave compute node sending a quote response to the master compute node across the secure trusted communications channel (operation 556). Sending the quote response may be controlled by Hostboot code on each slave compute node. For example, Hostboot code on each slave compute node may return a quote response to Hostboot code on the master compute node as a structured message containing the slave compute node ID, the Nonce from the master compute node, TPM quote data (as defined by Trusted Computing Group's TPM specification), the TPM quote signature (the data having been signed by the primary AK of the slave compute node's TPM), the contents of PCR0-7, and the slave compute node's TPM event log. Each slave compute node sends a quote response to the master compute node. For example, in FIG. 6C, Hostboot code on the slave compute node n1 ("SCNn1 Hostboot" in FIG. 6C) sends the quote response in the form of a "$q_m$ blob" message ("$q_m$—quote using Nonce$_{n1}$, contents of message ordered" in FIG. 6C) to Hostboot code on the master compute node ("MCN Hostboot" in FIG. 6C), and Hostboot code on the slave compute node n2 ("SCNn2 Hostboot" in FIG. 6C) sends a quote response in the form of a "$q_m$ blob" message ("$q_m$—quote using Nonce$_{n2}$, contents of message ordered" in FIG. 6C) to Hostboot code on the master compute node ("MCN Hostboot" in FIG. 6C). In FIG. 6C, the subscript "m" in the "$q_m$ blob" message denotes a message type for the quote response where TPM is required. The "$q_m$ blob" message is ordered as follows:

Node ID;
Nonce from Master;
Quote;
Signature;
PCR0-7; and
TPM Log.

In response to Hostboot code on the master compute node receiving the "$q_m$ blob" from each slave compute node in operation 556, the operation set 420 continues with Hostboot code on the master compute node extending a hash of the "$q_m$ blob" message to the master compute node's TPM(s) PCR1 and adding the entire "$q_m$ blob" message (not hash of) to the master compute node's TPM event log (operation 558). Also, in operation 558, Hostboot code on the master compute node may save the "$q_m$ blob" message received from each slave compute node in local memory (e.g., the "$q_m$ blob" message (or portions thereof) received from each respective one of the slave compute nodes may be saved in an information field denoted as "quote response(s) 264" in memory 206 in FIG. 2).

In accordance with one or more embodiments, as illustrated in FIG. 5D and FIG. 6C, host firmware on the master compute node may at this time locally validate the credentials of each slave compute node (operation 560) prior to enabling node merge operations. Operation 560, as denoted by the dotted lines in FIG. 5D and FIG. 6C, is discretionary. Local validation by Hostboot (and/or other host firmware) at this point is preferred, but depends on the host firmware having a sufficiently high level validation code.

As illustrated in FIG. 5D and FIG. 6C, Hostboot (and/or other host firmware) on the master compute node may be charged with performing this discretionary confirmation of slave compute node authenticity prior to training the final collection of nodes (operation 562, described below). One skilled in the art will appreciate, however, this discretionary confirmation of slave compute node authenticity may be performed by Hostboot (and/or other host firmware) on the master compute node any time before completion of node merge operations.

For example, Hostboot (and/or other host firmware) on the master compute node in operation 560 may validate the credentials of each slave compute node by analyzing (at least cursorily) the "$q_m$ blob" message received from each slave compute node for any prohibited level of firmware, or by utilizing other well-known authentication techniques to analyze the "$q_m$ blob" message received from each slave compute node.

In accordance with one or more other embodiments, the host firmware on the master compute node may defer to a trusted third party to perform validation after completion of node merge operations but prior to trusting the system to secure workloads (operation 566, discussed below). The necessary information may be subsequently provided (i.e., after completion of node merge operations but prior to trusting the system to secure workloads) to a trusted third party via what is a well-known remote attestation process to enable the third party to confirm authenticity of the slave compute nodes.

A final node-to-node message (i.e., a "Train" message, described below) in the authentication protocol, in accordance with one or more embodiments, is sent (operation 562, described below) to each slave compute node at the end of the quote process to disable (operation 564, described below) the slave compute node TPMs (all future interactions are with the master compute node TPM(s) only) and to trigger completion of the node merge operations that enable processor bus communications for full system connectivity.

The operation set 420 continues with the master compute node sending a "Train" message to each slave compute node across the secure trusted communications channel (operation 562). Sending the "Train" message may be controlled by Hostboot on the master compute node. For example, Hostboot code on the master compute node ("MCN Hostboot" in FIG. 6C) may send the "Train" message to Hostboot code on each slave compute node ("SCNn1 Hostboot" and "SCNn2 Hostboot" in FIG. 6C) to train the final collection of nodes. For example, in FIG. 6C, T/t—"train the final collection of nodes" is sent to slave compute node n1 ("SCNn1 Hostboot" in FIG. 6C), and T/t—"train the final collection of nodes" is sent to slave compute node n2 ("SCNn2 Hostboot" in FIG. 6C). In FIG. 6C, the identifier "T" denotes a message type for the "Train" message where TPM is NOT required (T: train the bus, mark all TPMs as lost, open up all the links ( )). Also, in FIG. 6C, the identifier "t" denotes a message type for the "Train" message where TPM is required (t: train the bus, open only links with good TPMs 0).

The operation set 420 continues with Hostboot code on each slave compute node disabling the slave compute node's TPM(s) (operation 564). Hostboot code on each slave compute node ("SCNn1 Hostboot" and "SCNn2 Hostboot in FIG. 6C) may disable the slave compute node's TPM(s) by, for example, "poisoning" the slave compute node's registers (e.g., extending random numbers to all the PCRs of the slave compute node's TPM(s) and not logging the event to the TPM event logs—accordingly, attestation will never validate against the TPM event logs or other published values).

As noted above, in accordance with one or more other embodiments, the host firmware on the master compute node may defer to a trusted third party to perform validation after completion of node merge operations but prior to trusting the system to secure workloads (operation 566). The necessary information may be subsequently provided (i.e., after completion of node merge operations but prior to trusting the system to secure workloads) to a trusted third party via what is a well-known remote attestation process to enable the third party to confirm authenticity of the slave compute nodes.

In one example, in operation 566, after the node merge operations are completed (but before the multi-node system is trusted to secure workloads), an attestation server may confirm the authenticity of the slave compute nodes (as well as the authenticity of the master compute node) via the remote attestation process. The process of retrieving and analyzing a quote is known as remote attestation, discussed earlier. Remote attestation is a client/server process. In the process of remote attestation, an attestation server retrieves a quote from a client TPM. In this case, the client TPM is the master compute node's TPM. In operation 566, as shown in FIG. 6C, the master compute node's TPM may send a quote to an attestation server (in response to the master compute node's TPM having received a request for a quote from an attestation server).

In the process of remote attestation, the attestation server also retrieves the TPM event log from the client. In operation 566, as shown in FIG. 6C, Hostboot code (but more likely hypervisor firmware and/or other host firmware since this operation would typically occur after IPL and Hostboot code has gone away) on the master compute node may send the TPM event log to the attestation server (in response to host firmware on the master compute node having received a request for the TPM event log from the attestation server). Additional data (e.g., the "$q_m$ blob" message received by the master compute node from each slave compute node and cached on the master compute node's local memory) may also be sent by host firmware on the master compute node to the attestation server (e.g., in response to host firmware on the master compute node having received a request for such additional data from the attestation server).

Before a quote and the TPM event log (and, possibly, additional data) can be sent to the attestation server, the client TPM (master compute node's TPM) must be enrolled at the attestation server. As discussed earlier, during enrollment, the attestation server verifies the client TPM (master compute node's TPM) Endorsement Key (EK) against the root EK from the TPM manufacturer, and presents a challenge to the client TPM (master compute node's TPM) that can only be completed if the client TPM (master compute node's TPM) is the owner of the EK and a unique Attestation Key (AK) (i.e., the unique AK generated by the master compute node's TPM for the purpose of signing the quote).

Once enrolled, the client TPM (master compute node's TPM) can send a quote to the attestation server in response to receiving a request for a quote. Likewise, host firmware on the master compute node can send the TPM event log (and, possibly, additional data) in response to receiving a request for the TPM event log (and, possibly, a request for such additional information).

In response to receiving the quote from the client TPM (master compute node's TPM) and the TPM event log (and, possibly, additional data) from host firmware on the master compute node, the attestation server may verify the integrity of the of the quote using a secure hash of all PCR values, verify the signature over the quote against the master compute node's TPM AK (i.e., the unique AK generated by the master compute node's TPM for the purpose of signing the quote), verify the TPM event log (to which the TPM event log of each slave compute node's TPM was added in operation 558) by replaying the measurements and comparing the calculated PCR values to those in the quote, and/or by utilizing other well-known authentication techniques to analyze the "$q_m$ blob" message received by the master compute node from each slave compute node. As discussed above, the "$q_m$ blob" message received by the master compute node from each slave compute node is added in operation 558 to the master compute node's local TPM event log (256 in FIG. 2) and cached in the master compute node's local memory (264 in FIG. 2).

In accordance with one or more embodiments, in response to receiving the quote from the client TPM (master compute node's TPM) and the TPM event log (and, possibly, additional data) from host firmware on the master compute node, the attestation server may determine whether the PCR values of the master compute node's TPM—the PCR1 of which was extended in operation 558 to reflect the $q_m$ blob message received from each slave compute node's TPM—on this boot are the same as: the last (i.e. the previous time the multi-node system booted and the authenticity of the compute nodes was confirmed via remote attestation); a reference or "golden" state that was recorded earlier; and/or a published state. In accordance with one or more embodiments, in response to receiving the quote from the client TPM (master compute node's TPM) and the TPM event log (and, possibly, additional data) from host firmware on the master compute node, the attestation server may also analyze the "$q_m$ blob" message received by the master compute node from each slave compute node against one or more lists of approved/prohibited firmware.

In another example, after the node merge operations are completed and a hypervisor is running on the multi-node system, the hypervisor may serve as the local attestation agent for remote third party confirmation of the authenticity of the slave compute nodes (and the master compute node) via the remote attestation process before the operating system(s) is/are loaded into system memory.

In yet another example, after the node merge operations are completed and the operating system(s) is/are running on the multi-node system, the operating system(s) in conjunction with the hypervisor may serve as the local attestation agent for remote third party confirmation of the authenticity of the slave compute nodes (and the master compute node) via the remote attestation process before the multi-node system is trusted to secure workloads.

Figure 7:
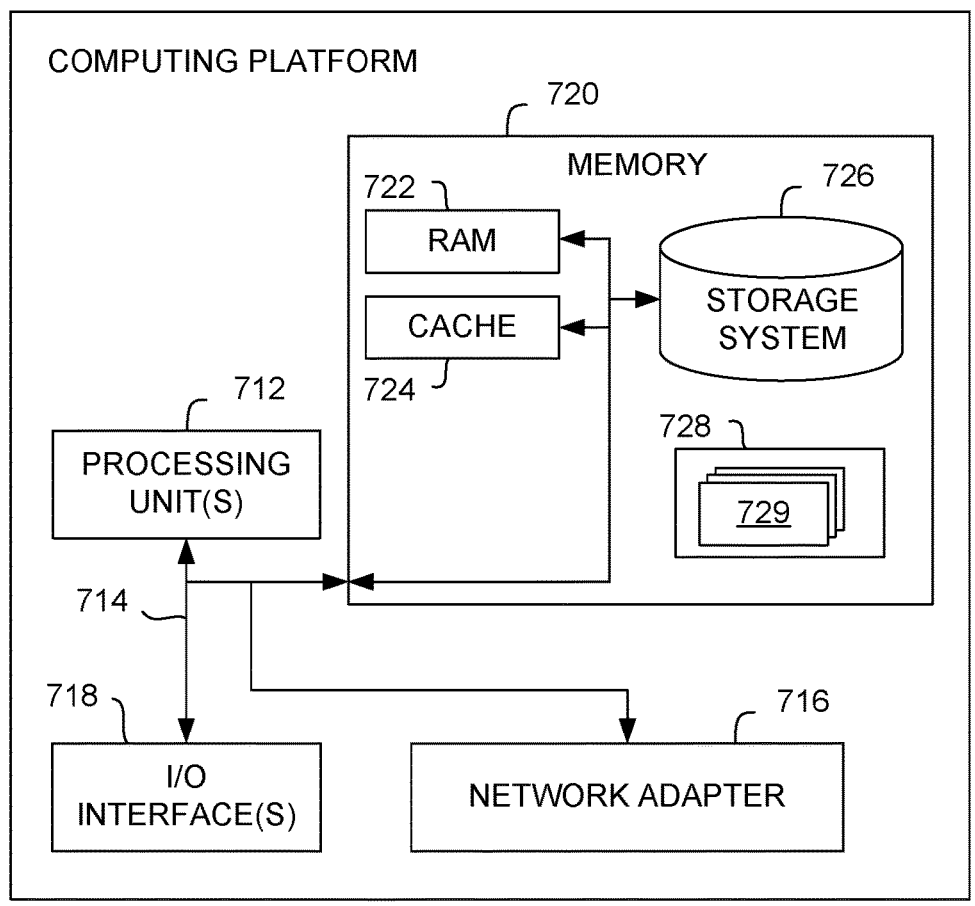
FIG. 7 is a block diagram of an example computing platform that may be suitable for practicing one or more embodiments.

FIG. 7 is a block diagram of an example computing platform 700 that may be suitable for practicing one or more embodiments (e.g., one or more embodiments discussed above with reference to the multi-node system 100 of FIG. 1 and/or one or more embodiments discussed above with reference to the multi-node system 300 of FIG. 3). In one or more embodiments, the computing platform 700 may be configured to provide one or more compute nodes (such as the compute nodes 102a-n in FIG. 1 and/or the compute nodes Node_0, Node_1 in FIG. 3), one or more service processors (such as the FSP 116 in FIG. 1 and/or the service processors SP_A, SP_B in FIG. 3), and/or one or more hardware management consoles (such as the HMC 120 in FIG. 1). In one or more embodiments, each of the compute nodes may include a computing platform such as the computing platform 700. Various elements of the computing platform 700 may be shared between multiple compute nodes or may be separate for different compute nodes. The computing platform 700 may include, or be part of, any number of computing systems, such as a server system.

The components of the computing platform 700 may include, but are not limited to, one or more processors or processing units 712, a system memory 720, and a bus 714 that couples various platform components including system memory 720 to the processing unit(s) 712. Each of the processing unit(s) 712 may include one or more processing cores or other processing devices. The bus 714 represents one or more of any of several types of bus structures, including a memory bus or memory controller, a peripheral bus, an accelerated graphics port, a processor or local bus using any of a variety of architectures. By way of example, and without limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computing platform 700 typically includes a variety of computer readable media. Such media may be any available media that is accessible by the computing platform 700, and it includes both volatile and non-volatile media, as well as removable and non-removable media.

The system memory 720 can include computer readable media in the form of volatile memory, such as random access memory (RAM) 722 and/or cache memory 724. The computing platform 700 may further include other removable/non-removable, volatile/non-volatile computer system storage media. By way of example only, a storage system 726 can be provided for reading from and writing to a non-removable, non-volatile magnetic media (not shown and typically called a "hard drive"), and other non-removable, non-volatile media (e.g., a "solid-state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM or other optical media can be provided. In such instances, each can be connected to a bus 714 by one or more data media interfaces. As will be further depicted and described below, the system memory 720 may include at least one computer program product having a set (e.g., at least one) of program modules that are configured to carry out the functions of one or more embodiments.

The program/utility 728, having a set (at least one) of program modules 729, may be stored in system memory 720 by way of example, and not limitation, as well as an operating system, one or more application programs, other program modules, and program data. Each of the operating system, one or more application programs, other program modules, and program data or some combination thereof, may include an implementation of a networking environment. The program modules 729 generally carry out the functions and/or methodologies of one or more embodiments as described herein.

The techniques and systems described herein may be used to provide trust-related operations to any suitable component of the computing platform 700 or combination of multiple computing platforms 700.

The system memory 720 may be employed to store a copy, at least temporarily, of programming instructions implementing any suitable methods disclosed herein (or portions thereof) when executed by the processing unit(s) 712, herein denoted as program modules 729. For example, in one or more embodiments, the computing platform 700 may implement one or more of the compute nodes 102*a-n* of FIG. 1 and/or one or more of the compute nodes Node_0, Node_1 of FIG. 3. In another example, in one or more embodiments, the computing platform 700 may implement the flexible service processor (FSP) 116 of FIG. 1 and/or one or more of the service processors SP_A, SP_B of FIG. 3. In some such embodiments, the system memory 720 may be employed to store, at least temporarily, a copy of programming instructions implementing the method 400 of FIG. 4 (or portions thereof).

The computing platform 700 may also communicate with one or more external devices, such as a keyboard, a pointing device, a display, or one or more other devices that enable a user to interact with the computing platform 700. The computing platform 700 may also include other devices, such as a network card or modem that enable the computing platform 700 to communicate with one or more other computing devices. Such communication can occur via Input/Output (I/O) interfaces 718. Still further, the computing platform 700 can communicate with one or more networks, such as a local area network (LAN), a general wide area network (WAN), and/or a public network (e.g., the Internet) via a network adapter 716. As depicted, the network adapter 716 communicates with other components of the computing platform 700 via the bus 714. It should be understood that although not shown, other hardware and/or software components could be used in conjunction with the computing platform 700. Examples include, but are not limited to, microcode, device drivers, redundant processing units, external disk drive arrays, RAID systems, tape drives, and data archival storage systems.

In various embodiments, one or more elements of the computing platform 700 illustrated in FIG. 7 may not be included, or additional components may be included. For example, in one or more embodiments in which the computing platform 700 is configured to implement the flexible service processor (FSP) 116 of FIG. 1, the computing platform 700 may not include I/O interface(s) 718. In one or more embodiments in which the computing platform 700 is configured to implement one or more of the compute node 102*a-n* of FIG. 1, the network adapter 716 may include an interface to the secure trusted communications channel 113 of FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. As noted above, FIGS. 1-4, FIGS. 5A-5D, and FIGS. 6A-6D describe embodiments of the present invention implemented in a multi-node system that utilizes the Secure Boot feature. For Secure Boot, the CRTM code is based on self boot engine/Hostboot (SBE/HB). One skilled in the art will appreciate, however, that aspects of the present invention may be utilized in conjunction with other root of trust for measurement (RTM) models, such as a static RTM model. In a static RTM model, the CRTM code, which is typically included in the basic input output system (BIOS), must be run first when the server or the physical hardware environment is powered on, or when the server or physical hardware environment is reset. POST BIOS code of each of the compute nodes is firmware that runs on the host processors to initialize the memory and processor bus during initial program load (IPL). For example, the BIOS firmware on each compute node in a multi-node system may include POST BIOS code that runs when the system has just been powered up or the reset button was pressed (also known as a "cold boot"). As used herein, "BIOS" may refer to an interface between an operating system and platform firmware, and may include Unified Extensible Firmware Interface (UEFI). Each compute node in a multi-node system may be initially in an unmerged state with a separate copy of BIOS running on each node. Without departing from the spirit and scope of the present invention, POST BIOS code may be adapted to include multi-node merge code that implements an authentication protocol (or portions thereof) with active TPM provisioning for merging multiple compute nodes with multiple TPMs. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A method for merging compute nodes into a single multi-node system, wherein each of the compute nodes includes firmware and a trusted platform module (TPM) accessible to the firmware on the compute node, wherein the compute nodes are connected to be available for merger into the single multi-node system, wherein one of the compute nodes is assigned the role of master compute node and each of the remaining one(s) of the compute nodes is assigned the role of slave compute node, the method comprising:

executing an active TPM provisioning process between the master compute node and each slave compute node, wherein executing an active TPM provisioning process includes sending a message from the master compute node to each respective slave compute node, and sending, in response to receiving the message, a slave request from each respective slave compute node to the master compute node, wherein the slave request includes key information;

executing a challenge/response exchange between the master compute node and each slave compute node, wherein executing a challenge/response exchange includes sending an encrypted challenge from the master compute node to each respective slave compute node, and sending, in response to receiving the encrypted challenge, a slave response from each respective slave compute node to the master compute node, wherein the encrypted challenge includes a secret encrypted using the key information, wherein the secret is generated by the master computer node's TPM, and wherein the slave response includes the secret decrypted;

executing a quote request/response flow between the master compute node and each slave compute node, wherein executing a quote request/response flow includes sending a quote request from the master compute node to each respective slave compute node, and sending, in response to receiving the quote request, a quote response from each respective slave compute node to the master compute node, wherein the quote response includes contents of the slave compute node's TPM and a TPM event log associated with the slave compute node's TPM.

2. The method as recited in claim 1, wherein the key information includes a public part of an endorsement key (EK), and wherein the secret encrypted using the key information includes a nonce encrypted using the public part of the EK.

3. The method as recited in claim 1, wherein sending the quote request is controlled by the firmware on the master compute node including Hostboot code, and wherein sending the quote response is controlled by the firmware on each respective slave compute node including Hostboot code.

4. The method as recited in claim 1, further comprising;
validating, at a remote trusted third party, after completion of node merge operations but prior to trusting the multi-node system to secure workloads, the credentials of each respective slave compute node based on a quote received from the master compute node's TPM and a TPM event log received from the firmware on the master compute node.

5. The method as recited in claim 1, wherein each compute node's TPM includes multiple platform configuration registers (PCRs), including PCR0, PCR1, PCR2, PCR3, PCR4, PCR5, PCR6, and PCR7, and wherein the quote request from the master compute node to each respective slave compute node includes a nonce and specific PCR contents requested from the slave compute node's TPM.

6. The method as recited in claim 5, further comprising:
performing, at each respective slave compute node, in response to receiving the quote request from the master compute node, the following operations:
retrieving a quote from the slave compute node's TPM;
reading PCR0-7 of the slave compute node's TPM.

7. The method as recited in claim 6, wherein the quote response sent from each respective slave compute node to the master compute node includes a structured message containing the slave compute node's ID, the nonce received from the master compute node in the quote request, TPM quote data, a TPM quote signature, contents of PCR0-7 of the slave compute node's TPM, and a TPM event log associated with the slave compute node's TPM.

8. The method as recited in claim 5, wherein the quote response sent from each respective slave compute node to the master compute node includes a structured message containing the slave compute node's ID, the nonce received from the master compute node in the quote request, TPM quote data, a TPM quote signature, contents of PCR0-7 of the slave compute node's TPM, and a TPM event log associated with the slave compute node's TPM.

9. The method as recited in claim 8, further comprising:
performing, at the master compute node, in response to receiving the quote response from each respective slave compute node, the following operations:
extending PCR1 of the master compute node's TPM with a hash of the quote response from the slave compute node;
adding the quote response to a TPM event log associated with the master compute node's TPM.

10. The method as recited in claim 9, further comprising;
validating, at the master compute node, after receiving the quote response from each respective slave compute node but prior to enabling node merge operations, the credentials of each respective slave compute node.

11. The method as recited in claim 10, wherein validating, at the master compute node, after receiving the quote response from each respective slave compute node but prior to enabling node merge operations, the credentials of each respective slave compute node includes analyzing the quote response received from each slave compute node for any prohibited level of firmware.

12. The method as recited in claim 10, further comprising:
sending, in response to validating the credentials of each respective slave compute node, a "Train" message from the master compute node to each respective slave compute node to disable the respective slave compute node's TPM and to trigger completion of the node merge operations that enable processor bus communications for full system connectivity.

13. The method as recited in claim 12, further comprising;
disabling, at each respective slave compute node, in response to receiving the "Train" message from the master compute node, each respective slave compute node's TPM.

14. The method as recited in claim 9, further comprising:
sending, in response to receiving the quote response from each respective slave compute node, a "Train" message from the master compute node to each respective slave compute node to disable the respective slave compute node's TPM and to trigger completion of the node merge operations that enable processor bus communications for full system connectivity.

15. The method as recited in claim 14, further comprising;
disabling, at each respective slave compute node, in response to receiving the Train message from the master compute node, each respective slave compute node's TPM.

16. The method as recited in claim 15, further comprising;
validating, at a remote trusted third party, after completion of node merge operations but prior to trusting the multi-node system to secure workloads, the credentials of each respective slave compute node.

17. The method as recited in claim 16, wherein validating, at a remote trusted third party, after completion of node merge operations but prior to trusting the multi-node system to secure workloads, the credentials of each respective slave compute node includes:
the trusted third party retrieving, via a remote attestation process, a quote from the master compute node's TPM and a TPM event log from the firmware on the master compute node.

18. A multi-node computer system, comprising:
compute nodes, each having a processor, a memory, and a bus that couples various compute node components including the memory to the processor, wherein each of the compute nodes includes firmware and a trusted platform module (TPM) accessible to the firmware on the compute node, wherein the compute nodes are connected to be available for merger into a single multi-node system, and wherein one of the compute nodes is assigned the role of master compute node and each of the remaining one(s) of the compute nodes is assigned the role of slave compute node, the multi-node computer system configured to perform a method comprising:
executing an active TPM provisioning process between the master compute node and each slave compute node, wherein executing an active TPM provisioning process includes sending a message from the master compute node to each respective slave compute node, and sending, in response to receiving the message, a slave request from each respective slave compute node to the master compute node, wherein the slave request includes key information;
executing a challenge/response exchange between the master compute node and each slave compute node, wherein executing a challenge/response exchange includes sending an encrypted challenge from the master compute node to each respective slave compute node, and sending, in response to receiving the encrypted challenge, a slave response from each respective slave compute node to the master compute node, wherein the encrypted challenge includes a secret encrypted using the key information, wherein the secret is generated by the master computer node's TPM, and wherein the slave response includes the secret decrypted;

executing a quote request/response flow between the master compute node and each slave compute node, wherein executing a quote request/response flow includes sending a quote request from the master compute node to each respective slave compute node, and sending, in response to receiving the quote request, a quote response from each respective slave compute node to the master compute node, wherein the quote response includes contents of the slave compute node's TPM and a TPM event log associated with the slave compute node's TPM.

19. The multi-node computer system as recited in claim 18, wherein each compute node's TPM includes multiple platform configuration registers (PCRs), including PCR0, PCR1, PCR2, PCR3, PCR4, PCR5, PCR6, and PCR7, wherein the quote request from the master compute node to each respective slave compute node includes a nonce and specific PCR contents requested from the slave compute node's TPM.

20. The multi-node computer system as recited in claim 19, wherein the quote response sent from each respective slave compute node to the master compute node includes a structured message containing the slave compute node's ID, the nonce received from the master compute node in the quote request, TPM quote data, a TPM quote signature, contents of PCR0-7 of the slave compute node's TPM, and a TPM event log associated with the slave compute node's TPM.

21. A computer program product for merging compute nodes into a single multi-node system, each compute node having a processor, a memory, and a bus that couples various compute node components including the memory to the processor, wherein each of the compute nodes includes firmware and a trusted platform module (TPM) accessible to the firmware on the compute node, wherein the compute nodes are connected to be available for merger into the single multi-node system, wherein one of the compute nodes is assigned the role of master compute node and each of the remaining one(s) of the compute nodes is assigned the role of slave compute node, the computer program product comprising a non-transitory computer readable storage medium having program code embodied therewith, the program code executable by a processor or other programmable data processing apparatus to perform a method comprising:

executing an active TPM provisioning process between the master compute node and each slave compute node, wherein executing an active TPM provisioning process includes sending a message from the master compute node to each respective slave compute node, and sending, in response to receiving the message, a slave request from each respective slave compute node to the master compute node, wherein the slave request includes key information;

executing a challenge/response exchange between the master compute node and each slave compute node, wherein executing a challenge/response exchange includes sending an encrypted challenge from the master compute node to each respective slave compute node, and sending, in response to receiving the encrypted challenge, a slave response from each respective slave compute node to the master compute node, wherein the encrypted challenge includes a secret encrypted using the key information, wherein the secret is generated by the master computer node's TPM, and wherein the slave response includes the secret decrypted;

executing a quote request/response flow between the master compute node and each slave compute node, wherein executing a quote request/response flow includes sending a quote request from the master compute node to each respective slave compute node, and sending, in response to receiving the quote request, a quote response from each respective slave compute node to the master compute node, wherein the quote response includes contents of the slave compute node's TPM and a TPM event log associated with the slave compute node's TPM.

22. The computer program product as recited in claim 21, wherein each compute node's TPM includes multiple platform configuration registers (PCRs), including PCR0, PCR1, PCR2, PCR3, PCR4, PCR5, PCR6, and PCR7, wherein the quote request from the master compute node to each respective slave compute node includes a nonce and specific PCR contents requested from the slave compute node's TPM.

23. The computer program product as recited in claim 22, wherein the quote response sent from each respective slave compute node to the master compute node includes a structured message containing the slave compute node's ID, the nonce received from the master compute node in the quote request, TPM quote data, a TPM quote signature, contents of PCR0-7 of the slave compute node's TPM, and a TPM event log associated with the slave compute node's TPM.

24. A method for merging compute nodes into a single multi-node system, wherein each of the compute nodes includes firmware and a trusted platform module (TPM) accessible to the firmware on the compute node, wherein the compute nodes are connected to be available for merger into the single multi-node system, wherein one of the compute nodes is assigned the role of master compute node and each of the remaining one(s) of the compute nodes is assigned the role of slave compute node, the method comprising:

executing an active TPM provisioning process between the master compute node and each slave compute node, wherein executing an active TPM provisioning process includes sending a message from the master compute node to each respective slave compute node, and sending, in response to receiving the message, a slave request from each respective slave compute node to the master compute node, wherein the slave request includes a node ID, an endorsement key (EK) certificate, a public part of an EK, and a public part of an attestation signing key (AK) and the AK name;

executing a challenge/response exchange between the master compute node and each slave compute node, wherein executing a challenge/response exchange includes sending an encrypted challenge from the master compute node to each respective slave compute node, and sending, in response to receiving the encrypted challenge, a slave response from each respective slave compute node to the master compute node, wherein the encrypted challenge includes a nonce encrypted using the public part of the EK, wherein the nonce is generated by the master computer node's TPM, and wherein the slave response includes the nonce decrypted using a private part of the EK;

executing a quote request/response flow between the master compute node and each slave compute node, wherein executing a quote request/response flow includes sending a quote request from the master compute node to each respective slave compute node, and sending, in response to receiving the quote request, a quote response from each respective slave compute node to the master compute node, wherein the quote response includes contents of the slave compute node's TPM and a TPM event log associated with the slave compute node's TPM.

25. A computer program product for merging compute nodes into a single multi-node system, each compute node having a processor, a memory, and a bus that couples various compute node components including the memory to the processor, wherein each of the compute nodes includes firmware and a trusted platform module (TPM) accessible to the firmware on the compute node, wherein the compute nodes are connected to be available for merger into the single multi-node system, wherein one of the compute nodes is assigned the role of master compute node and each of the remaining one(s) of the compute nodes is assigned the role of slave compute node, the computer program product comprising a non-transitory computer readable storage medium having program code embodied therewith, the program code executable by a processor or other programmable data processing apparatus to perform a method comprising:

executing an active TPM provisioning process between the master compute node and each slave compute node, wherein executing an active TPM provisioning process includes sending a message from the master compute node to each respective slave compute node, and sending, in response to receiving the message, a slave request from each respective slave compute node to the master compute node, wherein the slave request includes a node ID, an endorsement key (EK) certificate, a public part of an EK, and a public part of an attestation signing key (AK) and the AK name;

executing a challenge/response exchange between the master compute node and each slave compute node, wherein executing a challenge/response exchange includes sending an encrypted challenge from the master compute node to each respective slave compute node, and sending, in response to receiving the encrypted challenge, a slave response from each respective slave compute node to the master compute node, wherein the encrypted challenge includes a nonce encrypted using the public part of the EK, wherein the nonce is generated by the master computer node's TPM, and wherein the slave response includes the nonce decrypted using a private part of the EK;

executing a quote request/response flow between the master compute node and each slave compute node, wherein executing a quote request/response flow includes sending a quote request from the master compute node to each respective slave compute node, and sending, in response to receiving the quote request, a quote response from each respective slave compute node to the master compute node, wherein the quote response includes contents of the slave compute node's TPM and a TPM event log associated with the slave compute node's TPM.

* * * * *